（12）United States Patent
Greiner et al.

(10) Patent No.: US 10,725,685 B2
(45) Date of Patent: Jul. 28, 2020

(54) LOAD LOGICAL AND SHIFT GUARDED INSTRUCTION

(71) Applicant: INTERNATIONAL BUSINESS MACHINES CORPORATION, Armonk, NY (US)

(72) Inventors: Dan F. Greiner, San Jose, CA (US); Christian Jacobi, West Park, NY (US); Marcel Mitran, Markham (CA); Volodymyr Paprotski, Thronhill (CA); Anthony Saporito, Highland, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 373 days.

(21) Appl. No.: 15/409,684

(22) Filed: Jan. 19, 2017

(65) Prior Publication Data

US 2018/0203634 A1 Jul. 19, 2018

(51) Int. Cl.
*G06F 3/06* (2006.01)
*G06F 9/30* (2018.01)

(52) U.S. Cl.
CPC .......... *G06F 3/0637* (2013.01); *G06F 3/0622* (2013.01); *G06F 3/0673* (2013.01); *G06F 9/30032* (2013.01); *G06F 9/30043* (2013.01); *G06F 9/30072* (2013.01)

(58) Field of Classification Search
CPC .................................................. G06F 3/0637
See application file for complete search history.

(56) References Cited

U.S. PATENT DOCUMENTS

| 3,360,780 | A | 12/1967 | Fabisch |
| 5,574,936 | A | 11/1996 | Ryba et al. |
| 5,644,752 | A | 7/1997 | Cohen et al. |
| 6,317,872 | B1 | 11/2001 | Gee |
| 6,438,707 | B1 | 8/2002 | Ronstrom |
| 6,462,992 | B2 | 10/2002 | Harari et al. |
| 7,043,505 | B1 | 5/2006 | Teague et al. |
| 7,197,585 | B2 | 3/2007 | Farrell et al. |

(Continued)

FOREIGN PATENT DOCUMENTS

| CN | 104468150 A | 3/2015 |
| TW | 201447581 A | 12/2014 |

(Continued)

OTHER PUBLICATIONS

IBM, "z/Architecture—Principles of Operation," SA22-7832-10, Eleventh Edition, Mar. 2015, pp. 1-1732.

(Continued)

*Primary Examiner* — Ryan Bertram
*Assistant Examiner* — Edmund H Kwong
(74) *Attorney, Agent, or Firm* — Steven Chiu, Esq.; Blanche E. Schiller, Esq.; Heslin, Rothenberg, Farley & Mesiti P.C.

(57) ABSTRACT

A guarded storage facility sets up a boundary indicating a range of addresses to be guarded or protected. When a program attempts to access an address in a guarded section defined by the boundary, a guarded storage event occurs. Use of this facility facilitates performance of certain tasks within a computing environment, including storage reclamation.

20 Claims, 11 Drawing Sheets

(56) References Cited

U.S. PATENT DOCUMENTS

| | | |
|---|---|---|
| 7,212,440 B2 | 5/2007 | Gorobets |
| 7,395,407 B2 | 7/2008 | Shen et al. |
| 7,496,737 B2 | 2/2009 | Uguen et al. |
| 7,555,506 B2 | 6/2009 | Venkatesh et al. |
| 7,555,619 B2 | 6/2009 | Harris |
| 8,041,923 B2 | 10/2011 | Greiner et al. |
| 8,078,827 B2 | 12/2011 | Uhlig et al. |
| 8,086,811 B2 | 12/2011 | Gainey, Jr. et al. |
| 8,176,279 B2 | 5/2012 | Farrell et al. |
| 8,250,331 B2 | 8/2012 | Yamada et al. |
| 8,327,084 B2 | 12/2012 | Von Praun et al. |
| 8,402,218 B2 | 3/2013 | Gray et al. |
| 8,452,938 B1 | 5/2013 | Tene |
| 8,547,724 B2 | 10/2013 | Lee et al. |
| 8,706,973 B2 | 4/2014 | Lee et al. |
| 8,880,959 B2 | 11/2014 | Greiner et al. |
| 9,095,802 B2 | 8/2015 | McCarthy et al. |
| 9,258,290 B2 | 2/2016 | Bursell |
| 9,262,320 B2 | 2/2016 | Alexander et al. |
| 9,280,447 B2 | 3/2016 | Farrell et al. |
| 9,286,076 B2 | 3/2016 | Belmar et al. |
| 9,336,046 B2 | 5/2016 | Greiner et al. |
| 9,400,736 B2 | 7/2016 | Gainey, Jr. et al. |
| 9,424,896 B2 | 8/2016 | Groot et al. |
| 9,520,193 B2 | 12/2016 | Cheriton |
| 9,747,203 B2 | 8/2017 | Frazier |
| 9,747,204 B2 | 8/2017 | Frazier |
| 9,749,448 B2 | 8/2017 | Guddeti |
| 9,760,374 B2 | 9/2017 | Grisenthwaite |
| 9,823,928 B2 | 11/2017 | Zeng et al. |
| 9,824,027 B2 | 11/2017 | Flynn et al. |
| 9,842,055 B2 | 12/2017 | Eddy et al. |
| 2005/0246402 A1 | 11/2005 | Wu |
| 2005/0257048 A1 | 11/2005 | Willman et al. |
| 2007/0005935 A1 | 1/2007 | Khosravi et al. |
| 2007/0011441 A1 | 1/2007 | Eichenberger et al. |
| 2008/0222397 A1 | 9/2008 | Wilkerson |
| 2009/0113110 A1 | 4/2009 | Chen et al. |
| 2010/0023703 A1 | 1/2010 | Christie |
| 2010/0031360 A1 | 2/2010 | Seshadri |
| 2010/0228938 A1* | 9/2010 | Moudgill ............ G06F 9/30032 711/165 |
| 2012/0102284 A1 | 4/2012 | Odaira |
| 2012/0198206 A1 | 8/2012 | Park |
| 2013/0036282 A1 | 2/2013 | Kawachiya et al. |
| 2013/0086360 A1* | 4/2013 | Zeng ................... G06F 9/30032 712/205 |
| 2013/0247008 A1 | 9/2013 | Mitran et al. |
| 2013/0247012 A1 | 9/2013 | Gainey, Jr. |
| 2013/0326192 A1 | 12/2013 | Ould-Ahmed-Vall et al. |
| 2013/0326519 A1 | 12/2013 | Anderson et al. |
| 2013/0339656 A1 | 12/2013 | Greiner et al. |
| 2015/0089154 A1 | 3/2015 | Busaba et al. |
| 2015/0113240 A1 | 4/2015 | Abrams et al. |
| 2015/0178078 A1 | 6/2015 | Anvin et al. |
| 2015/0269117 A1 | 9/2015 | Gainey, Jr. et al. |
| 2015/0277870 A1 | 10/2015 | Gschwind et al. |
| 2015/0277948 A1 | 10/2015 | Bradbury et al. |
| 2015/0278123 A1 | 10/2015 | Nayshtut et al. |
| 2016/0299712 A1 | 10/2016 | Kishan et al. |
| 2016/0357570 A1 | 12/2016 | Greiner et al. |
| 2016/0378490 A1 | 12/2016 | Lemay |
| 2017/0004072 A1 | 1/2017 | Frazier et al. |
| 2017/0004073 A1 | 1/2017 | Frazier et al. |
| 2017/0004074 A1 | 1/2017 | Frazier et al. |
| 2017/0004078 A1* | 1/2017 | Frazier ................ G06F 12/0269 |
| 2017/0031812 A1 | 2/2017 | Frazier et al. |
| 2017/0031813 A1 | 2/2017 | Frazier et al. |
| 2018/0203618 A1 | 7/2018 | Greiner et al. |
| 2018/0203619 A1 | 7/2018 | Greiner et al. |
| 2018/0203620 A1 | 7/2018 | Greiner et al. |
| 2018/0203633 A1 | 7/2018 | Greiner et al. |
| 2018/0203697 A1 | 7/2018 | Greiner et al. |
| 2019/0317768 A1 | 10/2019 | Greiner et al. |
| 2019/0324667 A1 | 10/2019 | Greiner et al. |

FOREIGN PATENT DOCUMENTS

| | | |
|---|---|---|
| TW | 201523249 A | 6/2015 |
| WO | WO2013186600 A1 | 12/2013 |
| WO | WO2015094189 A1 | 6/2015 |

OTHER PUBLICATIONS

IBM, "PowerISA—V. 2.07B," Apr. 9, 2015, pp. 1-1527.

Mcdonald, Austen et al., "Architectural Semantics for Practical Transactional Memory," Proceedings of the 33$^{rd}$ International Symposium on Computer Architecture, Jun. 2016, pp. 1-12.

Anonymous, "A Method to Detect and Prevent Memory Overwrites Across the Memory Chunks Allocated Within the Process Heap Area," IP.com No. IPCOM000196346D, May 31, 2010, pp. 1-6 (+ cover).

Germann, Ulrich, "Tightly Packed Tries: How to Fit Large Models into Memory, and Make them Load Fast, Too," Proceedings of the NAACL HLT Workshop on Software Engineering, Testing, and Quality Assurance for Natural Language Processing, Jun. 2009, pp. 31-39.

Lee, Ruby et al., "60-bit and Multimedia Extensions in the PA-RISC 2.0 Architecture," Proceedings of COMPCON '96, 1996 (no further date information available), pp. 152-160.

IBM, "Multi-Section Garbage Collection System Including Shared Performance Monitor Register," U.S. Appl. No. 14/972,345, filed Dec. 17, 2015, pp. 1-52.

IBM, "Multi-Section Garbage Collection System Including Multi-Use Source Register," U.S. Appl. No. 14/974,088, filed Dec. 18, 2015, pp. 1-49.

IBM, "Saving/Restoring Guarded Storage Controls in a Virtualized Environment", U.S. Appl. No. 15/409,633, filed Jan. 19, 2017, pp. 1-75.

IBM, "Guarded Storage Event Handling During Transactional Execution", U.S. Appl. No. 15/409,643, filed Jan. 19, 2017, pp. 1-70.

IBM, "Run-Time Instrumentation of Guarded Storage Event Processing", U.S. Appl. No. 15/409,657, filed Jan. 19, 2017, pp. 1-67.

IBM, "Loading and Storing Controls Regulating the Operation of a Guarded Storage Facility", U.S. Appl. No. 15/409,726, filed Jan. 19, 2017, pp. 1-59.

IBM, "Identifying Processor Attributes Based on Detecting a Guarded Storage Event", U.S. Appl. No. 15/409,755, filed Jan. 19, 2017, pp. 1-68.

List of IBM Patents or Patent Applications Treated as Related, Jan. 23, 2017, pp. 1-2.

Quora et al., "Why Do We Use Registers Instead of Memory?" Mar. 2015, https://www.quora.com/Why-do-we-use-registers-instead-of-memory, pp. 1-2.

International Search Report and Written Opinion for PCT/EP2018/050694, dated Mar. 15, 2018, pp. 1-12.

International Search Report and Written Opinion for PCT/EP2018/050120, dated Mar. 21, 2018, pp. 1-12.

International Search Report and Written Opinion for PCT/EP2018/050137, dated Apr. 13, 2018, pp. 1-10.

Greiner et al., "Guarded Storage Event Handling During Transactional Execution," U.S. Appl. No. 16/457,172, filed Jun. 28, 2019, pp. 1-69.

Greiner et al., "Identifying Processor Attributes Based on Detecting a Guarded Storage Event," U.S. Appl. No. 16/457,398, filed Jun. 28, 2019, pp. 1-69.

List of IBM Patents or Patent Applications Treated as Related, Oct. 3, 2019, pp. 1-2.

Jacobi et al., "Transactional Memory Architecture and Implementation for IBM System z," 45$^{th}$ Annual International Symposium on Microarchitecture, Jan. 2012, pp. 1-12.

\* cited by examiner

| GSC | GSO ALIGN-MENT | GSD BITS | SECTION SIZE | GSC | GSO ALIGN-MENT | GSD BITS | SECTION SIZE |
|---|---|---|---|---|---|---|---|
| 25 | 32 M | 0-38 | 512 K | 41 | 2 T | 0-22 | 32 G |
| 26 | 64 M | 0-37 | 1 M | 42 | 4 T | 0-21 | 64 G |
| 27 | 128 M | 0-36 | 2 M | 43 | 8 T | 0-20 | 128 G |
| 28 | 256 M | 0-35 | 4 M | 44 | 16 T | 0-19 | 256 G |
| 29 | 512 M | 0-34 | 8 M | 45 | 32 T | 0-18 | 512 G |
| 30 | 1 G | 0-33 | 16 M | 46 | 64 T | 0-17 | 1 T |
| 31 | 2 G | 0-32 | 32 M | 47 | 128 T | 0-16 | 2 T |
| 32 | 4 G | 0-31 | 64 M | 48 | 256 T | 0-15 | 4 T |
| 33 | 8 G | 0-30 | 128 M | 49 | 512 T | 0-14 | 8 T |
| 34 | 16 G | 0-29 | 256 M | 50 | 1 P | 0-13 | 16 T |
| 35 | 32 G | 0-28 | 512 M | 51 | 2 P | 0-12 | 32 T |
| 36 | 64 G | 0-27 | 1 G | 52 | 4 P | 0-11 | 64 T |
| 37 | 128 G | 0-27 | 2 G | 53 | 8 P | 0-10 | 128 T |
| 38 | 256 G | 0-25 | 4 G | 54 | 16 P | 0-9 | 256 T |
| 39 | 512 G | 0-24 | 8 G | 55 | 32 P | 0-8 | 512 T |
| 40 | 1 T | 0-23 | 16 G | 56 | 64 P | 0-7 | 1 P |

1300

| OFFSET | | CONTENT | MINIMUM LC |
|---|---|---|---|
| HEX | DEC | | |
| 000-1FF | 0-511 | VECTOR REGISTERS 0-31 | 10 |
| 200-3FF | 512-1,024 | RESERVED | |
| 400-407 | 1,024-1,031 | ZEROS | 11 |
| 408-40F | 1,033-1,039 | GSD REGISTER   1306 | |
| 410-417 | 1,040-1,047 | GSSM REGISTER   1308 | |
| 418-41F | 1,048-1,055 | GSEPL REGISTER   1310 | |

1302 (OFFSET), 1304 (CONTENT), 1306 (MINIMUM LC)

FIG. 13A

MACHINE CHECK EXTENDED SAVE AREA DESIGNATION (MCESAD)    1350

| MACHINE CHECK EXTENDED SAVE AREA ORIGIN (MCESAO) | RESERVED | LC |
|---|---|---|
| 0                                           1352 | N | 60   1354   63 |

FIG. 13B

SIGP PARAMETER REGISTER FOR THE STORE ADDITIONAL STATUS AT ADDRESS ORDER    1380

| ADDITIONAL STATUS AREA ORIGIN | RESERVED | LC |
|---|---|---|
| 0                                    1382 | N | 60   1384   63 |

FIG. 13C

LOAD LOGICAL AND SHIFT GUARDED INSTRUCTION

BACKGROUND

One or more aspects relate, in general, to processing within a computing environment, and in particular, to improving such processing.

Many modern programming languages, such as Java and Python, as examples, allow an application program to instantiate a data object by simply referencing it, with no obligation to track or subsequently free the memory when it is no longer needed.

Active data objects (that is, those in use by the application) and inactive data objects (that is, those no longer needed by the application) may be intermixed in the language's memory heap, resulting in a fragmented memory space. A process, commonly known as storage reclamation or garbage collection, not only removes inactive objects from the memory heap, but also relocates active memory objects by coalescing them into more compact blocks of memory. This allows for the free memory to be combined into larger contiguous blocks that are available for subsequent use by applications.

The challenge in relocating active data objects is just that—they are active, and may be simultaneously referenced by other central processing units besides the one performing the storage reclamation. Thus, to perform storage reclamation, the execution of all application processes that may be referencing memory while storage reclamation is in progress is suspended. Depending on the number of memory relocations needed, this could cause unacceptable delays in applications.

SUMMARY

Shortcomings of the prior art are overcome and additional advantages are provided through the provision of a computer program product for facilitating processing within a computing environment. The computer program product comprises a storage medium readable by a processing circuit and storing instructions for performing a method. The method includes, for instance, obtaining an instruction to perform a load and shift operation; and executing the instruction. The executing includes loading data from a location in memory, the location in memory designated by one or more fields associated with the instruction; shifting the data by a shift amount to obtain a shifted value; obtaining an intermediate result using the shifted value; and performing guarded storage detection based on the intermediate result.

By using the load data and shift operation to detect a guarded storage event, processing within the computing environment, including processing associated with certain tasks, is facilitated, thereby improving processing.

As examples, the data includes a pointer, and the shifting includes shifting the data left by the shift amount to obtain the shifted value. Further, in one embodiment, the method further includes obtaining the shift amount from a register used to specify one or more attributes of a guarded storage area.

In one embodiment, the performing guarded storage detection includes comparing a first portion of the intermediate result with an origin of a guarded storage area; determining whether a particular section of the guarded storage area is guarded, the determining using a second portion of the intermediate result; and detecting a guarded storage event based on the comparing indicating a specific result and the determining indicating the particular section is guarded.

Further, in one embodiment, the performing guarded storage detection includes placing the intermediate result in a selected location designated by the instruction, based on the comparing and determining not detecting the guarded storage event. As an example, the selected location is a register specified by a field of the instruction.

Moreover, in one embodiment, the obtaining the intermediate result includes adjusting the shifted value based on an addressing mode of a processor executing the instruction.

Yet further, in one embodiment, the method includes determining the location in memory from where the data is loaded. The determining uses, for instance, an index field, a base field and a displacement field of the instruction.

In one particular example, the instruction is a single architected instruction including an operation code indicating a load logical and shift guarded operation, a register field to specify a register to place a result based on determining that a guarded storage event was not detected, and a plurality of fields to determine the location in memory.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 13A depicts one example of a format of a machine check extended save area, in accordance with an aspect of the present invention;

FIG. 13B depicts one example of a machine check extended save area designation register, in accordance with an aspect of the present invention;

FIG. 13C depicts one example of a signal processor parameter register, in accordance with an aspect of the present invention.

DETAILED DESCRIPTION

In accordance with one or more aspects of the present invention, a capability is provided that facilitates performance of certain tasks within a computing environment including, but not limited to, storage reclamation. This capability, referred to as a guarded storage facility, sets up a boundary indicating a range of addresses that are guarded or protected, such as a range of addresses for which storage reclamation is to be performed. When a program attempts to access an address in a guarded section defined by the boundary, a guarded storage event occurs, thereby protecting the addresses within the boundary. Use of this facility facilitates processing within a computing environment and improves performance. For instance, use of this facility enables applications executing on one or more central processing units (CPUs) in a computing environment to continue executing while storage reclamation is in progress on another CPU in the computing environment. Applications may continue to access addresses not being protected by the boundary.

One or more aspects of the present invention provide one or more of the following, as examples: enable applications to set and inspect controls that affect the operation of the guarded storage facility; provide a capability to identify processor attributes when a guarded storage event is detected; load data (e.g., a compressed pointer) that is shifted by a variable amount and used in guarded storage detection; provide guarded storage event handling during transactional execution, including handling an abort of a transaction aborted due to a guarded storage event and the effects thereof.

An embodiment of a computing environment to incorporate and use one or more aspects of the present invention is described with reference to FIG. 1A. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

Figure 1A:
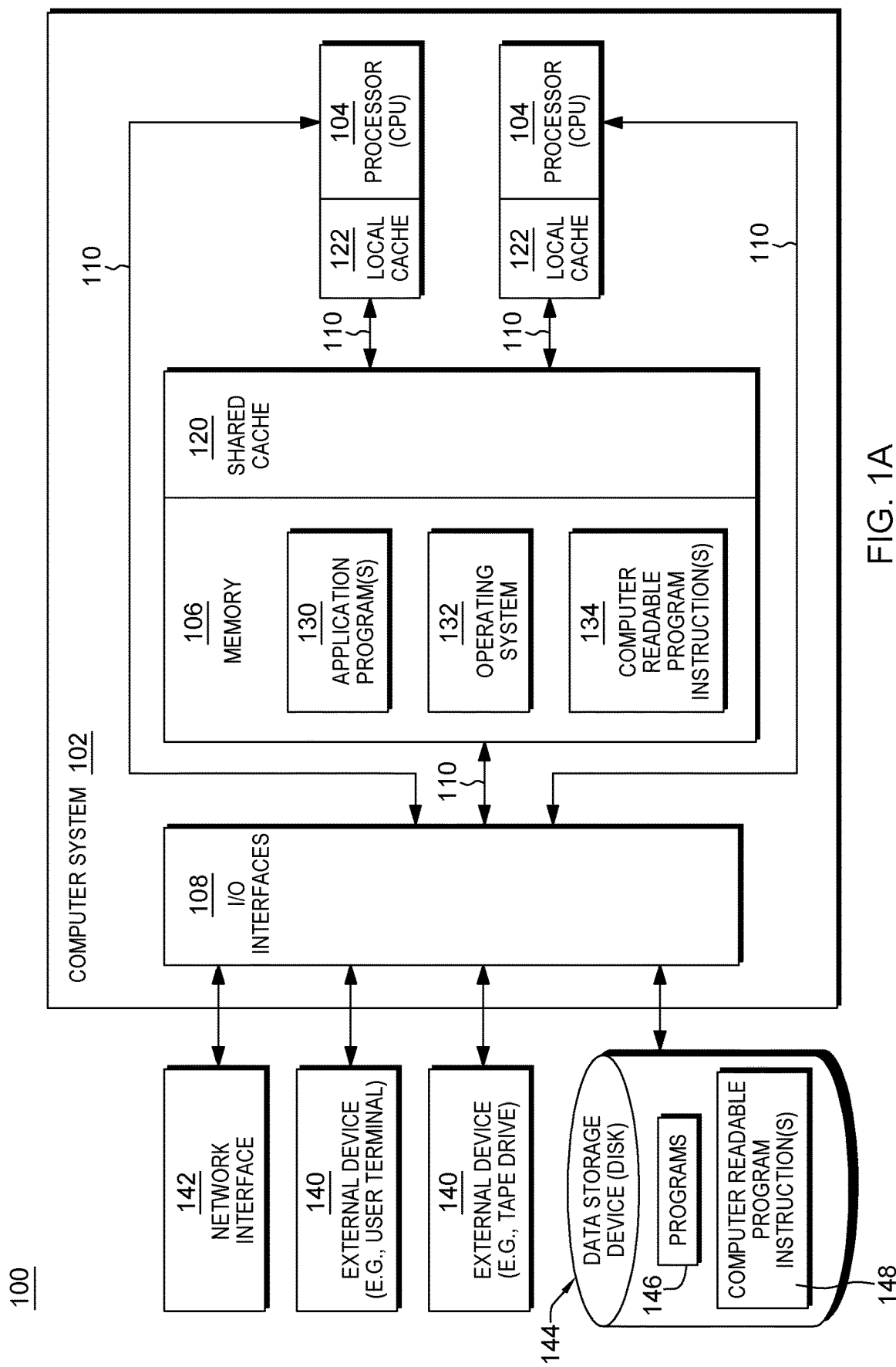
FIG. 1A depicts one example of a computing environment to incorporate and use one or more aspects of the present invention.

As shown in FIG. 1A, a computing environment 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (referred to as main memory or storage, as examples), and one or more input/output (I/O) interfaces 108, coupled to one another via one or more buses 110 and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 120, such as a shared cache, which may be coupled to local caches 122 of processors 104. Further, memory 106 may include one or more programs or applications 130, an operating system 132, and one or more computer readable program instructions 134. Computer readable program instructions 134 may be configured to carry out functions of embodiments of aspects of the invention.

Computer system 102 may also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 may store one or more programs 146, one or more computer readable program instructions 148, and/or data, etc. The computer readable program instructions may be configured to carry out functions of embodiments of aspects of the invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
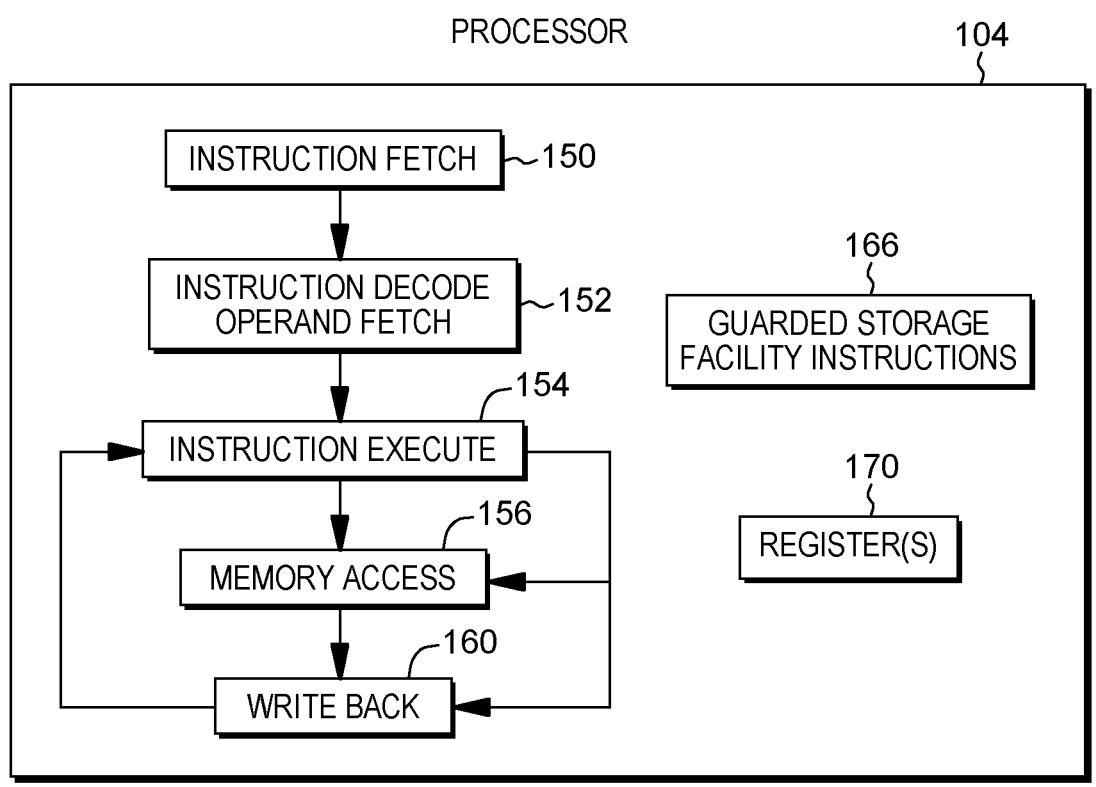
FIG. 1B depicts further details of the processor of FIG. 1A, in accordance with an aspect of the present invention.

Further details regarding one example of processor 104 are described with reference to FIG. 1B. Processor 104 includes a plurality of functional components used to execute instructions. These functional components include, for instance, an instruction fetch component 150 to fetch instructions to be executed; an instruction decode unit 152 to decode the fetched instructions and to obtain operands of the decoded instructions; instruction execution components 154 to execute the decoded instructions; a memory access component 156 to access memory for instruction execution, if necessary; and a write back component 160 to provide the results of the executed instructions. One or more of these components may, in accordance with an aspect of the present invention, be used to execute one or more instructions 166 of the guarded storage facility, described further below.

Processor 104 also includes, in one embodiment, one or more registers 170 to be used by one or more of the functional components.

Figure 2A:
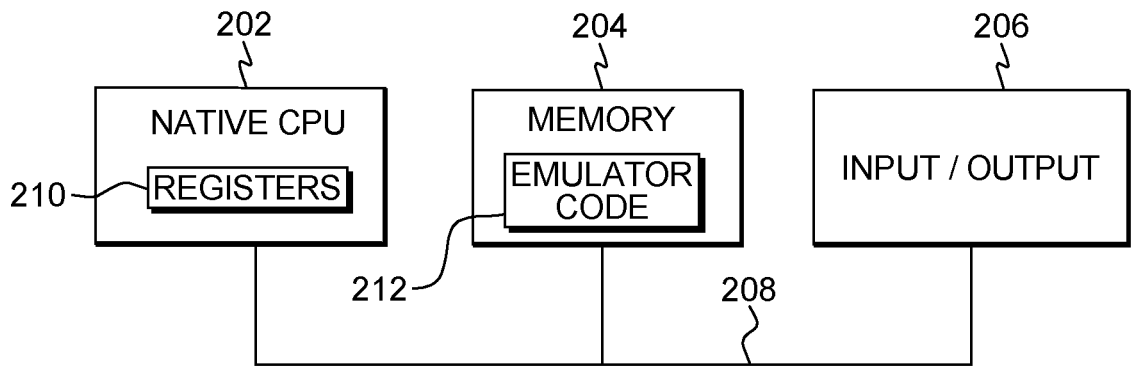
FIG. 2A depicts another example of a computing environment to incorporate and use one or more aspects of the present invention.

Another embodiment of a computing environment to incorporate and use one or more aspects is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a PowerPC processor or a pSeries server offered by International Business Machines Corporation, Armonk, N.Y.; and/or other machines based on architectures offered by International Business Machines Corporation, Intel, or other companies.

Native central processing unit 202 includes one or more native registers 210, such as one or more general purpose registers and/or one or more special purpose registers used during processing within the environment. These registers include information that represents the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate another architecture. For instance, emulator code 212 allows machines based on architectures other than the z/Architecture, such as PowerPC processors, pSeries servers, or other servers or processors, to emulate the z/Architecture and to execute software and instructions developed based on the z/Architecture.

Figure 2B:
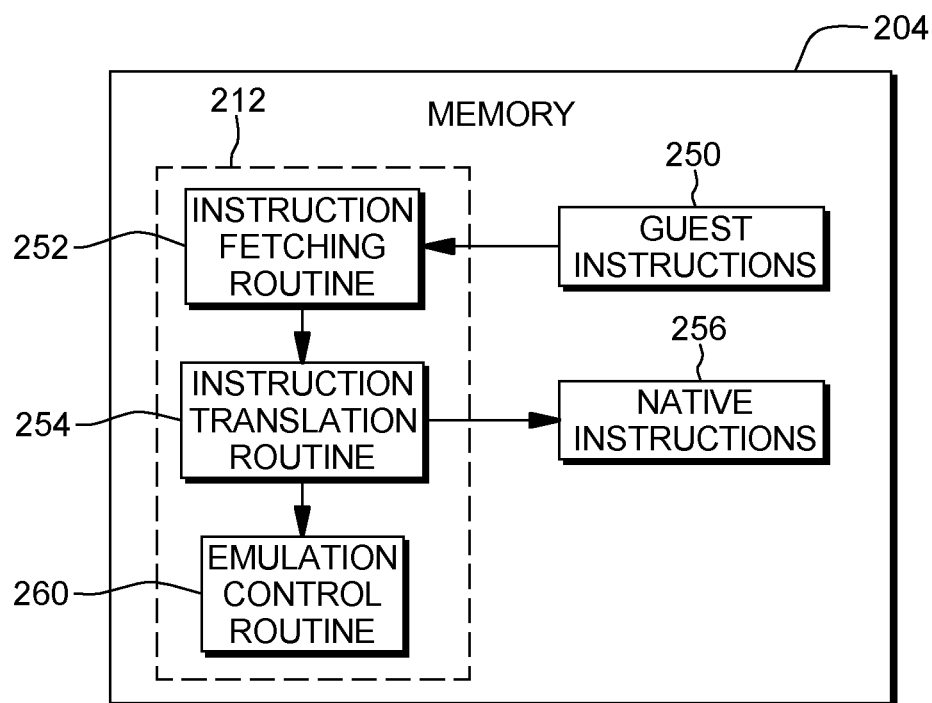
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a z/Architecture processor, but instead, are being emulated on native CPU 202, which may be, for example, an Intel processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode or Millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

A guest instruction 250 that is obtained, translated and executed is, for instance, an instruction of the guarded storage facility, a number of which are described herein. The instruction, which is of one architecture (e.g., the z/Architecture), is fetched from memory, translated and represented as a sequence of native instructions 256 of another architecture (e.g., PowerPC, pSeries, Intel, etc.). These native instructions are then executed.

Details relating to one embodiment of a guarded storage facility, including instructions associated therewith, are described below. The guarded storage facility provides a mechanism by which a program can designate an area of logical storage comprising a number of guarded storage sections (e.g., 0 to 64), and may be used, e.g., by various programming languages that implement storage reclamation techniques. The facility includes, for instance, a number of instructions, such as, for example: a Load Guarded (LGG)

instruction; a Load Logical and Shift Guarded (LLGFSG) instruction; a Load Guarded Storage Controls (LGSC) instruction; and a Store Guarded Storage Controls (STGSC) instruction, each of which is further described below.

When a selected operand, such as a second operand, of the Load Guarded or the Load Logical and Shift Guarded instruction does not designate a guarded section of the guarded storage area, the instruction performs its defined load operation. However, when the second operand of the instruction designates a guarded section of the guarded storage area, control branches to a guarded storage event handler with indications of the cause of the event. While the Load Guarded and Load Logical and Shift Guarded instructions are capable of generating a guarded storage event, other instructions that access a range of guarded storage are unaffected by the facility and do not generate such an event. Details relating to the instructions of the guarded storage facility are described further below, subsequent to a description of various registers used by the facility.

In one embodiment, the guarded storage facility is controlled by a bit in a control register, e.g., control register 2, and by the following three registers: a guarded storage designation register (GSD); a guarded storage section mask (GSSM) register; and a guarded storage event parameter list address (GSEPLA) register. The contents of these three registers may be loaded and inspected by the Load Guarded Storage Controls and Store Guarded Storage Controls instructions, respectively. Further details of each of these registers, as well as control register 2, are described below. In the description, particular values are described for specific bits or bytes. These values and/or the specific bits and/or bytes are just examples. Other values, bits and/or bytes may be used.

In one example, when the guarded storage facility is installed, a selected bit, e.g., bit 59, of control register 2 is the guarded storage enablement (GSE) control. When bit 59 is zero, attempted execution of the Load Guarded Storage Controls (LGSC) and Store Guarded Storage Controls (STGSC) instructions results in the recognition of an exception condition, for example, a special operation exception. However, when the guarded storage enablement control is one, the guarded storage facility is said to be enabled, and attempted execution of the LGSC and STGSC instructions is permitted, subject to other restrictions described below.

In one embodiment, execution of the Load Guarded and Load Logical and Shift Guarded instructions is not subject to the guarded storage enablement control. However, a guarded storage event may only be recognized, in one example, when the guarded storage enablement control is one. That is, in one example, when a selected facility indication (e.g., facility indication 133) is, e.g., one (indicating that the guarded storage facility is installed in the configuration), the program can use the Load Guarded and Load Logical and Shift Guarded instructions, regardless of the guarded storage enablement control. However, guarded storage events are not recognized without first loading guarded storage controls. Thus, the control program (e.g., operating system) is to set the guarded storage enablement control to one in order to successfully execute the Load Guarded Storage Controls instruction, which loads the guarded storage controls. A program is to examine the operating system provided indication (GSE) of the guarded storage facility enablement (rather than facility bit 133) to determine if the full capabilities of the facility are available.

As indicated above, in addition to the guarded storage facility enablement control, e.g., bit 59 of control register 2, the guarded storage facility uses a plurality of registers, including a guarded storage designation (GSD) register, which is, e.g., a 64-bit register that defines the attributes of the guarded storage area.

One embodiment of a guarded storage designation register (GSD) is described with reference to FIG. 3. A guarded storage designation register 300 includes the following fields, in one example:

Guarded Storage Origin (GSO) 302: This field designates an address of a block of storage that may have guarded storage protection applied. The location of the guarded storage area is specified by the leftmost bits of the GSD register. In one embodiment, the number of leftmost bits is determined by the value of the guarded storage characteristic (GSC) in bits 58-63 of the register. Bit positions 0 through (63−GSC) of the guarded storage designation register, padded on the right with binary zeros in bit positions (64−GSC) through 63, form the 64-bit logical address of the leftmost byte of the guarded storage area. Other embodiments may use a different mechanism of designating the origin of the guarded storage area.

In one embodiment, when the GSC is greater than 25, bit positions (64−GSC) through 38 are reserved and are to contain zeros; otherwise, the results of the guarded storage event detection are unpredictable. In one embodiment, bit positions 39-52 and 56-57 of the GSD register are reserved and are to contain zeros; otherwise, the program may not operate compatibly in the future. Other embodiments may allow a different range of GSC values, with corresponding changes to the size of the GSO.

Guarded Load Shift (GLS) 304: In one embodiment, bits 53-55 of the guarded storage designation register contain a 3-bit unsigned binary integer that is used in the formation of the intermediate result of the Load Logical and Shift Guarded instruction. Valid GLS values are 0-4, in one embodiment; values 5-7 are reserved and may result in an unpredictable shift amount.

Other embodiments may provide a broader range of GLS values allowing objects to be aligned on various boundaries, such as halfwords, words, doublewords, quadwords, etc.

Guarded Storage Characteristic (GSC) 306: In one embodiment, bit positions 58-63 of the guarded storage designation register contain a 6-bit unsigned binary integer that is treated as a power of two. Valid GSC values are, e.g., 25-56; values 0-24 and 57-63 are reserved and may result in an unpredictable guarded storage event detection. The GSC designates the following, in one example:

The alignment of the guarded storage origin. A GSC value of 25 indicates a 32 M-byte alignment, a value of 26 indicates a 64 M-byte alignment, and so forth.

The guarded storage section size. A GSC value of 25 indicates 512 K-byte sections, a value of 26 indicates 1 M-byte sections, and so forth. Other embodiments may allow different mechanisms of designating the GSC, with corresponding changes to the designation of the guarded storage origin and the guarded storage section size.

Figures 3, 4:
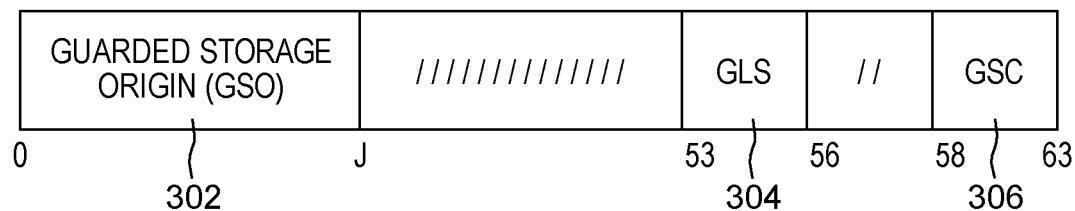
FIG. 3 depicts one example of a guarded storage designation register, in accordance with an aspect of the present invention.
FIG. 4 depicts one example of a relationship between guarded storage characteristics, a guarded storage origin and a guarded storage section size, in accordance with an aspect of the present invention.

The relationship between the guarded storage characteristic, guarded storage origin, and guarded storage section size is shown in FIG. 4. In FIG. 4, G is gigabytes ($2^{30}$); GSC is guarded storage characteristic; GSD is guarded storage designation; GSO is guarded storage origin; M is megabytes ($2^{20}$); P is petabytes ($2^{50}$); and T is terabytes ($2^{40}$).

Figure 5:
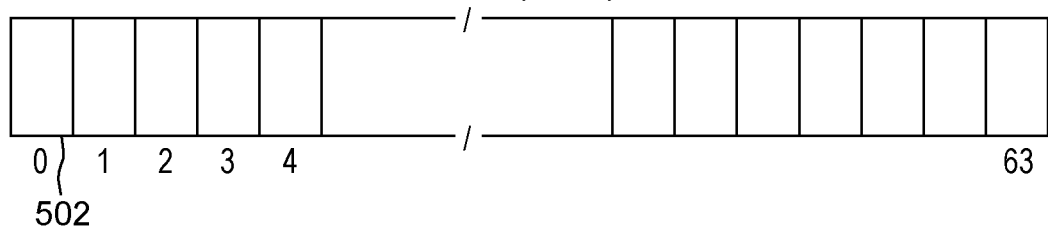
FIG. 5 depicts one example of a guarded storage section mask register, in accordance with an aspect of the present invention.

In addition to the guarded storage designation register, the guarded storage facility includes a guarded storage section mask register, one embodiment of which is described with reference to FIG. 5. In one example, a guarded storage section mask (GSSM) register 500 is a 64-bit register, and each bit 502 corresponds to one of the 64 guarded storage sections within the guarded storage area. As an example, bit 0 of the register corresponds to the leftmost section, and bit 63 corresponds to the rightmost section. Each bit, called a section guard bit, controls access to the respective section of the guarded storage area by the Load Guarded (LGG) and Load Logical And Shift Guarded (LLGFSG) instructions, as described below.

When all 64 bits of the GSSM register are zero, guarded storage events are not recognized. In other embodiments, GSSM register 500 may have a different number of bits corresponding to a different number of guarded sections, and/or one bit may be used to represent more than one guarded section. Many variations are possible.

Figure 6A:
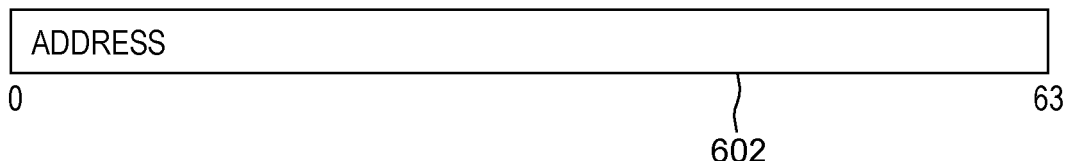
FIG. 6A depicts one example of a guarded storage event parameter list address register, in accordance with an aspect of the present invention.

The third register of the guarded storage facility is the guarded storage event parameter list address (GSEPLA) register, an example of which is depicted in FIG. 6A. As shown, a guarded storage event parameter list address register 600 includes, e.g., a 64-bit address 602 that is used to locate a guarded storage event parameter list (GSEPL), when a guarded storage event is recognized. In one embodiment, when the CPU is not in the access register mode, the GSEPLA is a logical address; when the CPU is in the access register mode, the GSEPLA is a primary virtual address.

When a guarded storage event is recognized, the GSEPL is accessed using the 64 bits of the GSEPLA, regardless of the current addressing mode of the CPU. The GSEPL is accessed using the current translation mode, except that when the CPU is in the access register mode, the GSEPL is accessed using the primary address space.

In one example, when a guarded storage event is recognized, various information is placed into the GSEPL, and control is passed to a GSE handler. Using the GSEPL, the handler routine can effect the relocation of the object, adjusting its pointer accordingly.

One example of a guarded storage event parameter list is described with reference to FIG. 6B. The fields of the guarded storage event parameter list, except the guarded storage event handler address, are stored into the guarded storage event parameter list when a guarded storage event is detected.

Figure 6B:
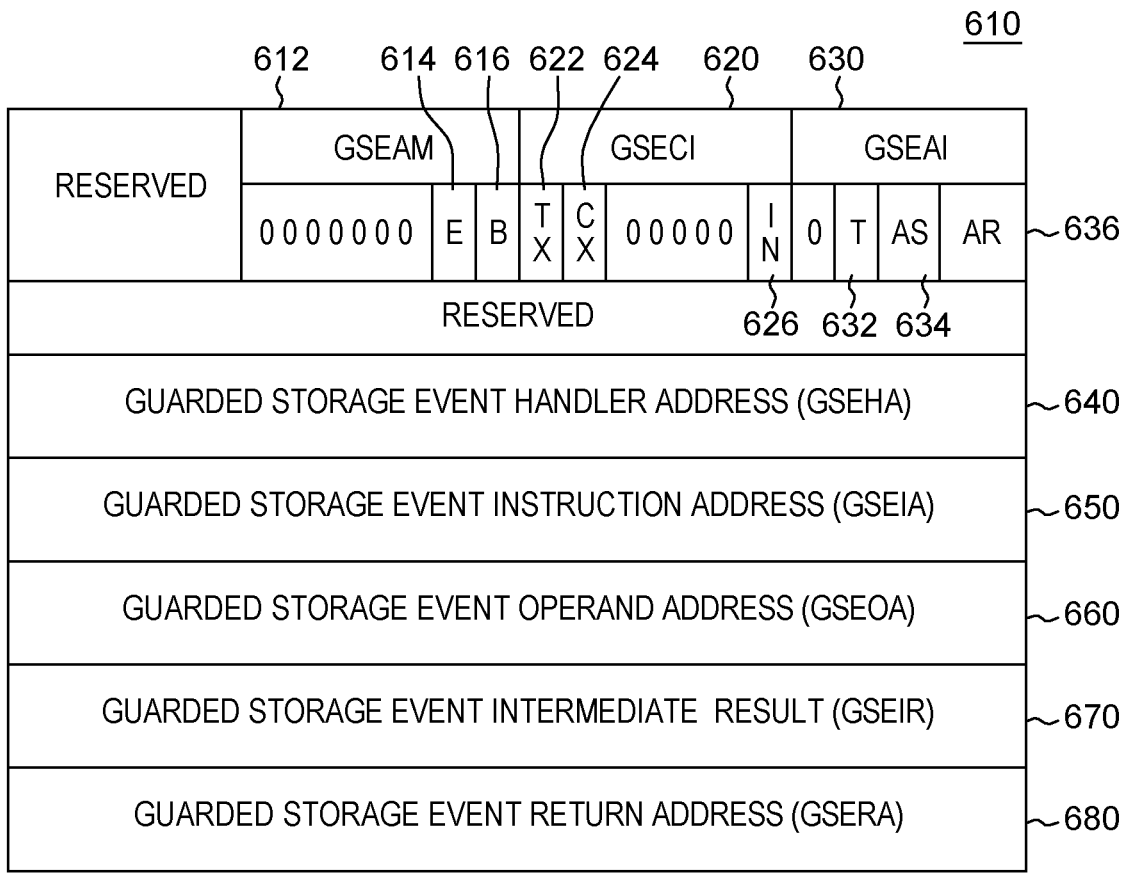
FIG. 6B depicts one example of a guarded storage event parameter list, in accordance with an aspect of the present invention.

Referring to FIG. 6B, in one example, the contents of a guarded storage event parameter list 610 include:

Reserved: Bytes 0 and 4-7 of the GSEPL are reserved, and, in one example, are set to zero when a guarded storage event is recognized.

Guarded Storage Event Addressing Mode (GSEAM) 612: Byte 1 of the GSEPL contains an indication of the addressing mode of the CPU when the guarded storage event was recognized, as follows:

Reserved: Bits 0-5 of the GSEAM are reserved and stored as zeros.

Extended Addressing Mode (E) 614: Bit 6 of the GSEAM contains the extended addressing mode bit, e.g., bit 31 of a program status word. The program status word is a control register that performs the functions of a status register and a program counter. It contains information used for proper program execution, including, but not limited to, a condition code, an instruction address, and other information, as described herein.

Basic Addressing Mode (B) 616: Bit 7 of the GSEAM contains the basic addressing mode bit, e.g., bit 32 of the program status word.

Bits 6 and 7 are set to, e.g., bits 31 and 32 of the PSW at the time the guarded storage event was recognized (i.e., in one embodiment, before bits 31 and 32 are replaced by the transaction abort PSW, described below).

Guarded Storage Event Cause Indications (GSECI) 620: Byte 2 of the GSEPL contains the guarded storage event cause indications. The GSECI is encoded as follows, in one example:

Transactional Execution Mode Indication (TX) 622: When bit 0 of the GSECI is zero, the CPU was not in transactional execution mode when the guarded storage event was recognized. When bit 0 of the GSECI is one, the CPU was in the transactional execution mode when the guarded storage event was recognized.

A CPU may be in nontransactional execution mode or transactional execution mode, and if in transactional execution mode, it may be in constrained transactional execution mode or in nonconstrained transactional execution mode. The CPU enters transactional execution mode by a transaction begin instruction and leaves the transactional execution mode by either a Transaction End instruction or an abort of the instruction. The transaction begin instruction may be a Transaction Begin (TBEGIN) instruction of a nonconstrained transactional execution mode or a Transaction Begin Constrained (TBEGINC) instruction of a constrained transactional execution mode. When the transaction begin instruction is of the constrained transactional execution mode, the CPU enters constrained transactional execution mode, which is subject to a number of limitations (e.g., a subset of the general instructions is available; a limited number of instructions may be executed; a limited number of storage operand locations may be accessed; and/or the transaction is limited to a single nesting level). In a nonconstrained transactional execution mode (referred simply as transactional executional mode), the limitations of the constrained transactional execution mode are not applied.

In one embodiment, during execution of the TBEGIN instruction when a nesting depth is initially zero (transactions may be nested), a transaction abort program status word (PSW) is set to the contents of the current program status word (PSW), and the instruction address of the transaction abort PSW designates the next sequential instruction (that is, the instruction following the outermost TBEGIN). During execution of the TEGINC instruction, when the nesting depth is initially zero, the transaction abort PSW is set to the contents of the current PSW, except that the instruction address of the transaction abort PSW designates the TBEGINC instruction (rather than the next sequential instruction following the TBEGINC).

When a transaction is aborted, various status information may be saved in a transaction diagnostic block (TDB).

Constrained Transactional Execution Mode Indication (CX) 624: When bit 1 of the GSECI is zero, the CPU was not in the constrained transactional execution mode when the guarded storage event was recognized. When bit 1 of the GSECI is one, the CPU was in the constrained transactional execution mode when the guarded storage event was recognized. Bit 1 of the GSECI is meaningful when bit 0 is one.

Reserved: Bits 2-6 of the GSECI are reserved, and, in one example, are set to zero when a guarded storage event is recognized.

Instruction Cause (IN) 626: Bit 7 of the GSECI indicates the instruction that caused the guarded storage event.

When bit 7 is zero, the event was caused by the execution of the Load Guarded instruction. When bit 7 is one, the event was caused by the execution of the Load Logical And Shift Guarded instruction. Other causes may similarly be indicated by using more than one bit.

Guarded Storage Event Access Information (GSEAI) 630:
Byte 3 of the GSEPL contains information describing the following CPU attributes, as examples:

Reserved: Bit 0 of the GSEAI is reserved, and, in one example, is set to zero when a guarded storage event is recognized.

DAT Mode (T) 632: Bit 1 of the GSEAI indicates the current dynamic address translation (DAT) mode (that is, the T bit is a copy of PSW bit 5).

Address Space Indication (AS) 634: Bits 2-3 of the GSEAI indicate the current address space controls (that is, the AS field is a copy of bits 16-17 of the PSW). The AS field is meaningful when DAT is enabled (that is, when the T bit is one); otherwise, the AS field is unpredictable.

Access Register Number (AR) 636: When the CPU is in the access-register mode, bits 4-7 of the GSEAI indicate the access register number used by the LGG or LLGFSG instruction causing the event (that is, the AR field is a copy of the $B_2$ field of the LGG or LLGFSG instruction). When the CPU is not in the access register mode, the AR field is unpredictable.

Guarded Storage Event Handler Address (GSEHA) 640:
Bytes 8-15 of the GSEPL contain the guarded storage event handler address. The contents of the GSEHA field are considered to be a branch address that is subject to the current addressing mode in the program status word (PSW). When a guarded storage event is recognized, the GSEHA field forms the branch address that is used to complete the execution of the Load Guarded or Load Logical And Shift Guarded instruction.

The instruction address in the PSW is replaced by the contents of the GESHA.

The guarded storage event handler address is specified by the program during execution of the Load Guarded Storage Controls instruction.

A guarded storage event is considered to be a program event recording (PER) successful branching event. If PER is enabled in, e.g., the PSW, and the PER branch address control is one in, e.g., control register 9, the GSEHA is the value compared with, e.g., control registers 10 and 11.

Guarded Storage Event Instruction Address (GSEIA) 650:
Bytes 16-23 of the GSEPL contain the guarded storage event instruction address. When a guarded storage event is recognized, the address of the instruction causing the event is stored into the GSEIA field. The address placed in the GSEIA is either that of the Load Guarded or Load Logical And Shift Guarded instruction, or that of the execute-type instruction whose target is a Load Guarded or Load Logical And Shift Guarded instruction, as examples.

Storing of the GSEIA field is subject to the current addressing mode when the event is detected. In the 24-bit addressing mode, bits 0-39 of the GSEIA are set to zeros. In the 31-bit addressing mode, bits 0-32 of the GSEIA are set to zeros.

Guarded Storage Event Operand Address (GSEOA) 660:
Bytes 24-31 of the GSEPL contain the guarded storage event operand address. When a guarded storage event is recognized, the second operand address of a Load Guarded or Load Logical And Shift Guarded instruction causing the event is stored into the GSEOA field.

Storing of the GSEOA field is subject to the current addressing mode when the event is detected. In the 24-bit addressing mode, bits 0-39 of the GSEOA are set to zeros. In the 31-bit addressing mode, bits 0-32 of the GSEOA are set to zeros.

If transactional execution is aborted due to the recognition of a guarded storage event, the GSEOA field contains the operand address formed during transactional execution. This is true even if the operand address was formed using one or more general registers that were altered during transactional execution, and regardless of whether the register(s) were restored when transactional execution was aborted.

Guarded Storage Event Intermediate Result (GSEIR) 670:
Bytes 32-39 of the GSEPL contain the guarded storage event intermediate result. When a guarded storage event is recognized, the intermediate result formed by a Load Guarded or Load Logical And Shift Guarded instruction is stored into the GSEIR field.

If transactional execution is aborted due to the recognition of a guarded storage event, the GSEIR field contains an intermediate result formed from the second operand location after the CPU has left the transactional execution mode (e.g., after the transaction was aborted).

Guarded Storage Event Return Address (GSERA) 680:
Bytes 40-47 of the GSEPL contain the guarded storage event return address.

When a guarded storage event is recognized while the CPU is in the transaction execution mode, the instruction address of the transaction abort PSW is placed into the GSERA. In the constrained transactional execution mode, the instruction address (i.e., the GSERA) designates the TBEGINC instruction. In the nonconstrained transactional execution mode, the instruction address (i.e., the GSERA) designates the instruction following the TBEGIN instruction.

When a guarded storage event is recognized while the CPU is not in the transactional execution mode, the contents of the GSERA are identical to the GSEIA.

During execution of the Load Guarded or Load Logical And Shift Guarded instruction, the GSEPL is accessed if a guarded storage event is recognized. Multiple accesses may be made to any field of the GSEPL when a guarded storage event is recognized.

Accesses to the GSEPL during guarded storage event processing are considered to be side effect accesses. Store type access exceptions are recognized for any byte of the GSEPL including the GSEHA field and reserved fields. If an access exception other than addressing is recognized while accessing the GSEPL, a side effect access indication, bit 54 of a translation exception identification at, e.g., real location 168-175, is set to one, and the Load Guarded or Load Logical And Shift Guarded instruction causing the guarded storage event is nullified.

When DAT is on, the GSEPL is accessed using the current address space control (ASC) mode, except when the CPU is in the access register mode; in the access register mode, the GSEPL is accessed in the primary address space.

Figure 7:
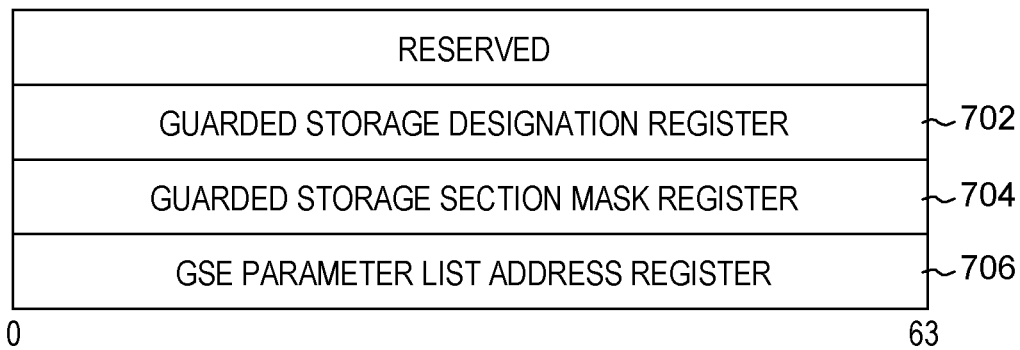
FIG. 7 depicts one example of a guarded storage control block, in accordance with an aspect of the present invention.

The three guarded storage registers may be set and inspected by means of the Load Guarded Storage Controls and Store Guarded Storage Controls instructions, respectively. The storage operand for each of these instructions is, e.g., a 32-byte guarded storage control block (GSCB), and the contents of the guarded storage registers occupy the last three eight-byte fields of the block, as shown in FIG. 7.

As depicted, in one example, a guarded storage control block (GSCB) 700 includes contents 702 of the guarded storage designation register, contents 704 of the guarded storage section mask register, and contents 706 of the GSE parameter list address register.

When the GSCB is aligned on a doubleword boundary, CPU access to each of the three defined fields is block concurrent.

For the Load Guarded Storage Controls instruction, reserved bit positions of the GSCB are to contain zeros, in one example; otherwise, the program may not operate compatibly in the future.

For the Store Guarded Storage Controls instruction, reserved bit positions that are loaded with nonzero values may or may not be stored as zeros, and reserved values of the GLS and GSC fields of the GSD register may or may not be corrected to model dependent values.

In an alternate embodiment, one or more of the values described in the GSEPL may instead be kept in additional registers, included in the GSCB, and loaded and stored by the Load Guarded Storage Controls and the Store Guarded Storage Controls instructions. Other examples also exist.

In one embodiment, the expected usage is that the program does not switch ASC mode between the establishment of the guarded storage controls and the recognition of a guarded storage event. If the program switches ASC mode, then, in one example, the GSEPL is to be mapped to common addresses in both the space where it was established and in the space where the guarded storage event was recognized. If a guarded storage event is recognized in the access register mode, the guarded storage event handler program may need to examine the GSEAI field to determine an appropriate ALET (access list entry token) with which to access the guarded storage operand.

Further, when a nonconstrained transaction is aborted due to a guarded storage event, the addressing mode from the transaction abort PSW becomes effective. The addressing mode that was in effect at the time of the guarded storage event can be determined by inspecting the GSEAM field in the GSE parameter list.

The addressing mode cannot be changed by a constrained transaction, in one embodiment; thus, in the one embodiment, if a constrained transaction is aborted due to a guarded storage event, the addressing mode is necessarily the same as when the TBEGINC instruction was executed.

Further details of each of the instructions of the guarded storage facility, including, for instance, Load Guarded, Load Logical and Shift Guarded, Load Guarded Storage Controls and Store Guarded Storage Controls, are described below. Each instruction may be a single architected machine instruction at the hardware/software interface. Further, each instruction may include a plurality of fields. In one embodiment, the fields of an instruction are separate and independent from one another. However, in another embodiment, more than one field may be combined. Further, a subscript number associated with a field of the instruction denotes the operand to which the field applies. For instance, any field having a subscript 1 is associated with a first operand, any field having a subscript 2 is associated with a second operand, and so forth.

Figure 8:
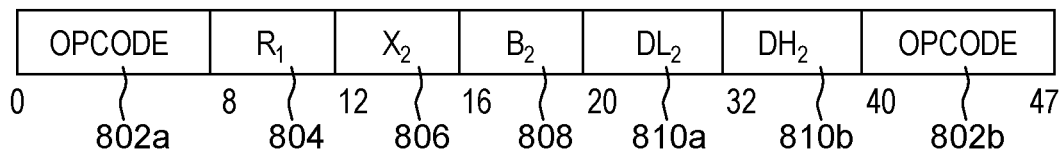
FIG. 8 depicts one embodiment of a Load Guarded instruction, in accordance with an aspect of the present invention.

One example of a Load Guarded (LGG) instruction is described with reference to FIG. 8. A Load Guarded instruction 800 includes, for instance, operation code (opcode) fields 802a, 802b to designate a load guarded operation; a register field ($R_1$) 804; an index field ($X_2$) 806; a base field ($B_2$) 808; and a displacement field comprising a first displacement ($DL_2$) field 810a and a second displacement ($DH_2$) field 810b. The contents of the second displacement field and the first displacement field are concatenated to provide a displacement, which is treated as a 20-bit signed binary integer, in one example.

When the $X_2$ 806 and $B_2$ 808 fields designate a general register other than register 0, the contents of the respective registers are added to the displacement to provide an address in storage that includes the second operand. The second operand is, e.g., a doubleword in storage. In one example, a specification exception is recognized and the operation is suppressed if the second operand address is not a doubleword boundary.

In operation of the Load Guarded instruction, a 64-bit intermediate result is formed, as follows:

As examples, in the 24-bit addressing mode, the intermediate result is formed from the concatenation of 40 binary zeros with bits 40-63 of the second operand. In the 31-bit addressing mode, the intermediate result is formed from the concatenation of 33 binary zeros with bits 33-63 of the second operand. In the 64-bit addressing mode, the intermediate result is formed from the entire second operand.

When the guarded storage facility is enabled, the intermediate result is used in guarded storage event detection, as an example. If a guarded storage event is recognized, then general register $R_1$ is not modified, and the instruction is completed, as described further below.

When either the guarded storage facility is not enabled, or the facility is enabled but a guarded storage event is not recognized, then the 64-bit intermediate result is placed in general register $R_1$, and the instruction is completed.

The guarded storage event parameter list (GSEPL) is accessed when a guarded storage event is recognized. Store type accesses apply to the entire GSEPL. The condition code remains unchanged.

As indicated above, in addition to the Load Guarded instruction, the guarded storage facility includes, in accordance with an aspect of the present invention, a Load Logical and Shift Guarded instruction. The Load Logical and Shift Guarded instruction is a single instruction (e.g., a single architected hardware instruction) that loads data from storage, shifts the data by a shift amount to obtain a shifted value, obtains an intermediate result using the shifted value, and performs guarded storage detection using the intermediate result.

In one particular example, the data is a 32-bit value that is shifted to the left by a number of bit positions specified in the guarded storage designation register to form, e.g., an intermediate 64-bit value. The 64-bit value is adjusted for the addressing mode; that is, in the 24-bit addressing mode, bits 0-39 are set to zeros; in the 31-bit addressing mode, bits 0-32 are set to zeros; and in the 64-bit addressing mode, the value is unchanged. Selected bits of the intermediate value are compared with a guarded storage origin (in the GSD register), and other selected bits of the intermediate value are used to index a bit in the guarded storage section mask (GSSM) register. If the comparison is equal and the indexed GSSM bit is one, a guarded storage event is detected. Otherwise, the instruction simply loads the intermediate value into a register.

Figure 9:
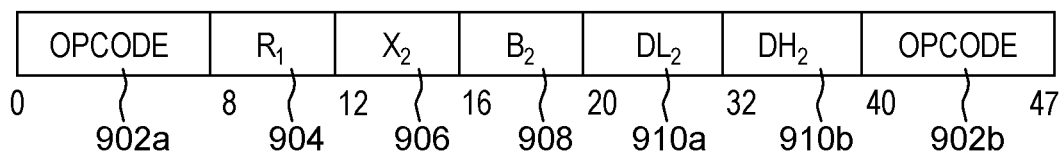
FIG. 9 depicts one example of a Load Logical And Shift Guarded instruction, in accordance with an aspect of the present invention.

One example of a Load Logical and Shift Guarded (LLGFSG) instruction is described with reference to FIG. 9. A Load Logical and Shift Guarded instruction 900 includes, for instance, opcode fields 902a, 902b to designate a load logical and shift guarded operation; a register field ($R_1$) 904; an index field ($X_2$) 906; a base field ($B_2$) 908; and a displacement field comprising a first displacement ($DL_2$) field 910a and a second displacement ($DH_2$) field 910b. The contents of the second displacement field and the first displacement field are concatenated to provide a displacement, which is treated as a 20-bit signed binary integer, in one example.

When the $X_2$ 906 and $B_2$ 908 fields designate a general register other than register 0, the contents of the respective registers are added to the displacement to provide an address in storage that includes the second operand. The second operand, e.g., is a word in storage. In one example, a specification exception is recognized and the operation is suppressed if the second operand address is not on a word boundary.

In operation of the Load Logical and Shift Guarded instruction, a 64-bit intermediate result is formed, as follows:

When the guarded storage facility is enabled (e.g., by means of bit 59 of control register 2), the intermediate result is formed using the guarded load shift value (GLS, in bits 53-55 of the guarded storage designation register). When the guarded storage facility is not enabled, the GLS value is assumed to be zero.

As examples, in the 24-bit addressing mode, the intermediate result is formed from the concatenation of 40 binary zeros, bits (8+GLS) through 31 of the second operand, and GLS binary zeros (i.e., a number equaling GLS of zeros). In the 31 bit addressing mode, the intermediate result is formed from the concatenation of 33 binary zeros, bits (1+GLS) through 31 of the second operand, and GLS binary zeros. In the 64-bit addressing mode, the intermediate result is formed from the concatenation of (32 GLS) binary zeros, the entire 32-bit second operand, and GLS binary zeros.

When the guarded storage facility is enabled, the intermediate result is used in guarded storage event detection, as an example. If a guarded storage event is recognized, then general register $R_1$ is not modified, and the instruction is completed, as described further below.

When either the guarded storage facility is not enabled, or the facility is enabled but a guarded storage event is not recognized, then the 64-bit intermediate result is placed in general register $R_1$, and the instruction is completed.

The guarded storage event parameter list (GSEPL) is accessed when a guarded storage event is recognized. Store type accesses apply to the entire GSEPL. The condition code remains unchanged.

With execution of either the Load Guarded or the Load Logical and Shift Guarded instruction, there may be the following program exceptions: Access (fetch, second operand; when a guarded storage event is recognized, fetch and store, GSEPL fields); Operation (guarded storage facility not installed); and specification.

Priority of execution for each of the Load Guarded and the Load Logical and Shift Guarded instructions is as follows:
1.-7. Exceptions with the same priority as the priority of program-interruption conditions for the general case.
8. Access exceptions for the second operand in storage.
9. Completion with no guarded storage event recognized.
10. Side-effect access exceptions for the guarded storage event parameter list.
11. Completion with a guarded storage event recognized.

The Load Logical And Shift Guarded instruction may be useful in loading what are sometimes referred to as compressed pointers in which some number of rightmost bits of the pointer address are absent in storage and assumed to be zeros. For instance, various languages, such as Java, may allocate data objects for its applications on integral storage boundaries (that is, on boundaries that are a power of two). For example, objects may be allocated on a word (4-byte), doubleword (8-byte), or quadword (16-byte) boundary. When an object is allocated on such a boundary, some number of the rightmost bits of the object's address are zero. For programming efficiency, it may be advantageous to represent the pointers to such objects using a 32-bit pointer, but this limits the range of addressability to 4 gigabytes (or, in the case of z/Architecture, which uses 31-bit addresses, the range of addressability is limited to 2 gigabytes), even when executing in the 64-bit addressing mode.

Since it is known that some number of rightmost bits of such an object (aligned on an integral boundary) are zero, these bits can be omitted from an in-memory representation of the pointer by shifting the pointer to the right by the number of expected zero bits. This allows the corresponding number of leftmost bits to be added to the pointer in storage, thus allowing the pointer to address a larger amount of memory than is possible using an un-shifted version. For example, if it is known that the pointers indicate doublewords, by shifting the pointer to the right by three bits, the range of addressability can be extended on the left by 3 bits, thus allowing the 32-bit pointer to address up to 32 gigabytes of memory (as opposed to the 4 gigabytes that can be addressed using an un-shifted pointer). Further, when the pointer is loaded for use by the CPU's memory subsystem, it is shifted to the left 3 bits to form a 35-bit pointer.

Assuming that a programming model uses compressed pointers that are of the same format (that is, the compressed pointers are all shifted right by the same number of bits), the instruction which performs the load-and-shift operation does not need to have an operand designating the shift amount. Rather, this can be a relatively static value that is loaded infrequently (e.g., when a task is dispatched). In one embodiment, the number of bits by which the compressed pointers are shifted is specified in the guarded load shift (GLS) field of the guarded storage designation (GSD) register. In another embodiment, the shift amount may be specified in an operand of the instruction. Other variations are also possible.

When the guarded storage facility is installed in a configuration, the Load Guarded (LGG) and Load Logical And Shift Guarded (LLGFSG) instructions can be executed regardless of the contents of the guarded storage enablement control (e.g., bit 59 of control register 2). However, guarded storage events may be recognized as a result of executing LGG or LLGFSG when (a) the GSE control is one, and (b) the guarded storage selection mask is nonzero. The guarded storage selection mask is not to be loaded without the GSE control being one.

A guarded storage event is not recognized when all 64 bits of the guarded storage selection mask (GSSM) are zero. The program can ensure that guarded storage events are not recognized by either (a) not loading the guarded storage controls, in which case the GSSM will contain its reset state of zeros, or (b) loading zeros into the GSSM.

One example of a Load Guarded Storage Controls (LGSC) instruction is described with reference to FIG. 10. The Load Guarded Storage Controls instruction provides parameters controlling the operation of a guarded storage event to the CPU, and provides information describing the state of the CPU at the time of the guarded storage event to the program.

Figure 10:
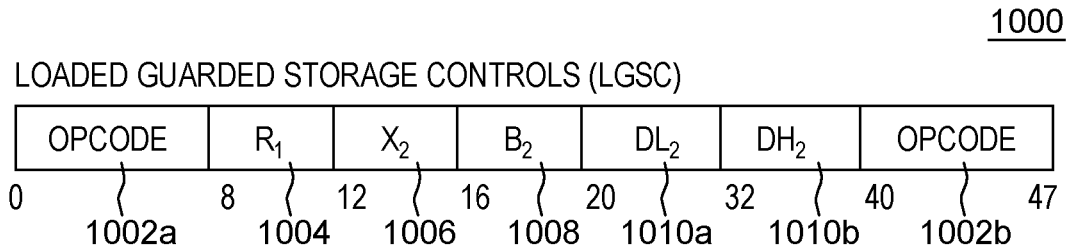
FIG. 10 depicts one example of a Load Guarded Storage Controls instruction, in accordance with an aspect of the present invention.

Referring to FIG. 10, a Load Guarded Storage Controls instruction 1000 includes opcode fields 1002a, 1002b to designate a load guarded storage controls operation; a register field ($R_1$) 1004; an index field ($X_2$) 1006; a base field ($B_2$) 1008; and a displacement field comprising a first displacement ($DL_2$) field 1010a and a second displacement ($DH_2$) field 1010b. The contents of the second displacement field and the first displacement field are concatenated to provide a displacement, which is treated as a 20-bit signed binary integer, in one example.

When the $X_2$ 1006 and $B_2$ 1008 fields designate a general register other than register 0, the contents of the respective registers are added to the displacement to provide an address in storage that includes the second operand.

In operation, contents of the guarded storage control block (GSCB) at the second operand address are loaded into the three guarded storage registers. The format of the guarded storage control block (GSCB) is shown in FIG. 7. The $R_1$ field of the instruction is reserved and should contain zero; otherwise, the program may not operate compatibly in the future.

Access exceptions are recognized for all 32 bytes of the GSCB.

If either the GLS or GSC fields of the GSD register being loaded contain invalid values, or if the reserved bit positions of the register do not contain zeros, the results are unpredictable. If the second operand contains either (a) invalid GLS or GSC values, or (b) nonzero values in the reserved bit positions, then it is model dependent whether the CPU replaces the invalid or nonzero values with corrected values. Furthermore, it is unpredictable whether such corrected values are subsequently stored by the Store Guarded Storage Controls instruction.

A special operation exception is recognized and the operation is suppressed when the guarded storage enablement control, e.g., bit 59 of control register 2, is zero.

The condition code remains unchanged, and there may be the following program exceptions: Access (fetch, second operand); Operation (if the guarded storage facility is not installed); Special Operation; and Transaction constraint.

If the GSC field of the GSD register contains an invalid value, guarded storage events may not occur or erroneous guarded storage events may be detected.

If the GLS field of the GSD register contains an invalid value, the intermediate result used by the Load Logical and Shift Guarded instruction may be formed from an unpredictable range of bits in the second operand, shifted by an unpredictable number of bits.

Figure 11:
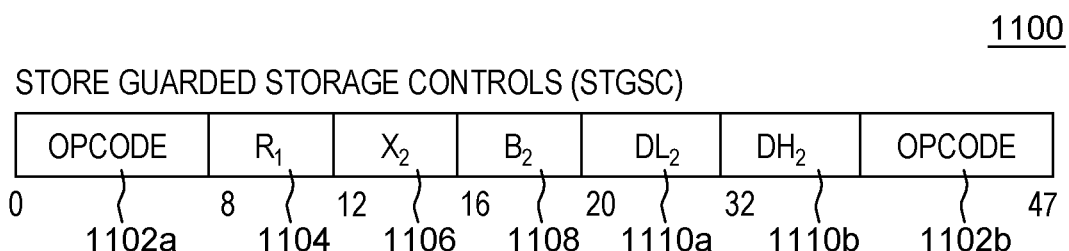
FIG. 11 depicts one example of a Store Guarded Storage Controls instruction, in accordance with an aspect of the present invention.

One example of a Store Guarded Storage Controls instruction is described with reference to FIG. 11. A Store Guarded Storage Controls instruction 1100 includes, for instance, opcode fields 1102a, 1102b to designate a store guarded storage controls operation; a register field ($R_1$) 1104; an index field ($X_2$) 1106; a base field ($B_2$) 1108; and a displacement field comprising a first displacement ($DL_2$) field 1110a and a second displacement ($DH_2$) field 1110b. The contents of the second displacement field and the first displacement field are concatenated to provide a displacement, which is treated as a 20-bit signed binary integer, in one example.

When the $X_2$ 1106 and $B_2$ 1108 fields designate a general register other than register 0, the contents of the respective registers are added to the displacement to provide an address in storage that includes the second operand.

In operation, the contents of the three guarded storage registers are stored at the second operand location. The second operand has the format of a guarded storage control block (GSCB), as shown in FIG. 7. In one embodiment, zeros are stored in the first eight bytes of the GSCB.

Access exceptions are recognized for all 32 bytes of the GSCB.

The $R_1$ field of the instruction is reserved and should contain zero; otherwise, the program may not operate compatibly in the future.

A special operation exception is recognized and the instruction is suppressed if the guarded storage enablement control, e.g., bit 59 of control register 2, is zero.

The condition code remains unchanged and there may be the following program exceptions: Access (store, second operand); Operation (if the guarded storage facility is not installed); Special Operation; and Transaction constraint.

For each of the instructions, although various fields and registers are described, one or more aspects of the present invention may use other, additional or fewer fields or registers, or other sizes of fields and registers, etc. Many variations are possible. For instance, implied registers may be used instead of explicitly specified registers or fields of the instruction. Again, other variations are also possible.

Figure 12:
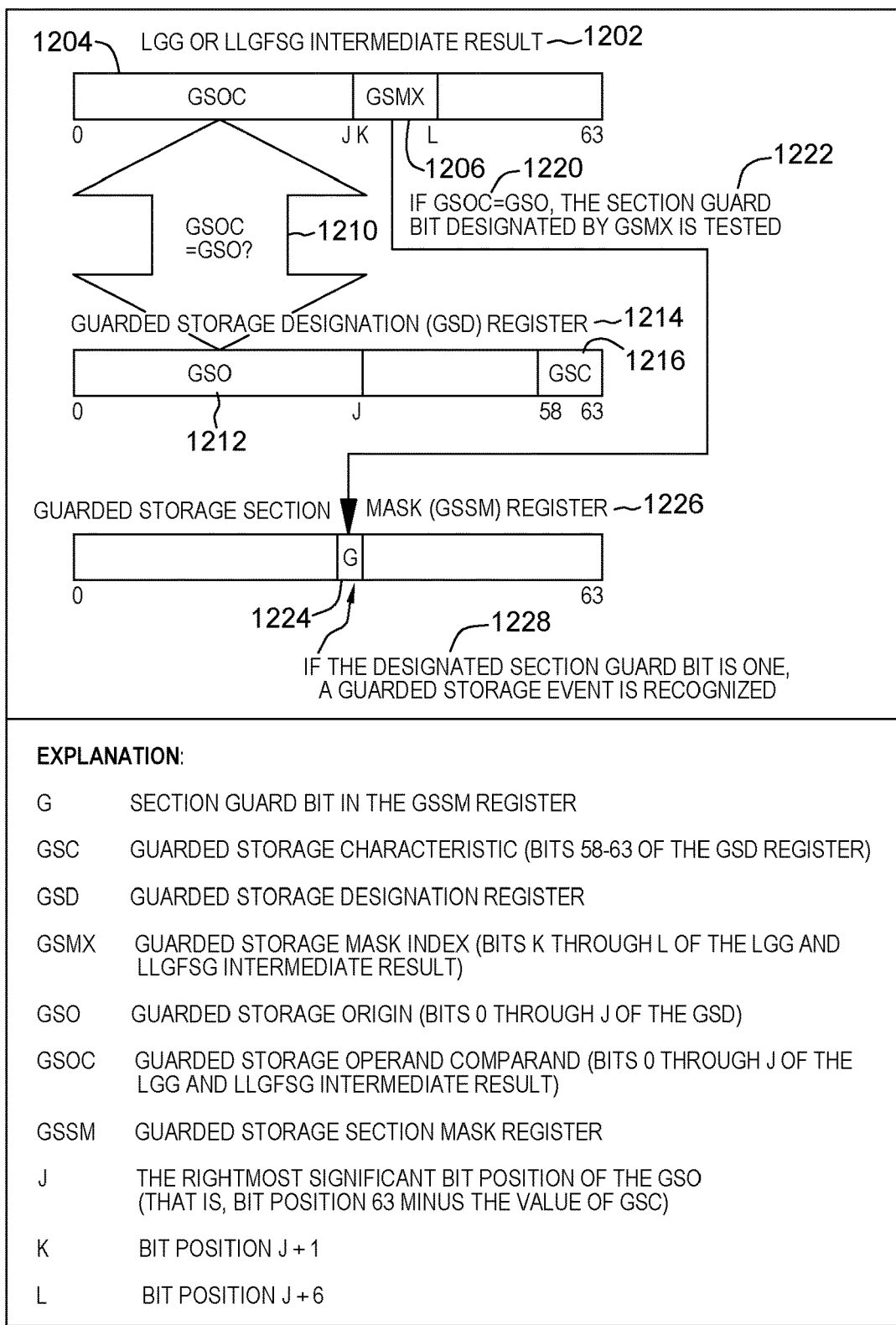
FIG. 12 depicts one example of detection of a guarded storage event, in accordance with an aspect of the present invention.

One or more of the above-described instructions and/or registers may be employed in guarded storage event detection used to detect a guarded storage event. As shown in FIG. 12, in one embodiment, guarded storage event detection 1200 uses, for instance, two values formed from the intermediate result 1202 of the Load Guarded (LGG) or Load Logical And Shift Guarded (LLGFSG) instruction, including, for instance, a guarded storage operand comparand (GSOC) 1204; and a guarded storage mask index (GSMX) 1206.

The guarded storage operand comparand (GSOC) 1204 is formed from the intermediate result of the Load Guarded or Load Logical And Shift Guarded instruction. For example, the GSOC comprises bit positions 0 through (63−GSC) of the intermediate result, inclusive (where GSC is the guarded storage characteristic in, e.g., bit positions 58-63 of the guarded storage designation register).

The GSOC is compared 1210 with the guarded storage origin 1212 (GSO) in the corresponding bit positions of the GSD register 1214, which also includes guarded storage characteristic 1216. When the GSOC is not equal to the GSO, a guarded storage event is not recognized, and the execution of the Load Guarded or Load Logical And Shift Guarded instruction is completed by placing the intermediate result into general register $R_1$.

When the GSOC is equal to the GSO 1220, the six bits of the intermediate result to the right of the GSOC form an unsigned binary integer called the guarded storage mask index (GSMX). The section guard bit (G) 1224 of the guarded storage section mask (GSSM) register 1226 corresponding to the GSMX is examined 1222. If the section guard bit is zero, a guarded storage event is not recognized, and the execution of the Load Guarded or Load Logical And Shift Guarded instruction is completed by placing the intermediate result into general register $R_1$. However, if the section guard bit is one, then a guarded storage event is recognized 1228.

Guarded storage event detection is not performed when either (a) the guarded storage facility is not enabled (by means of, e.g., bit 59 of control register 2), or (b) all bit positions of the guarded storage section mask (GSSM) register contain zeros, as examples.

In one embodiment, guarded storage controls may be captured on a machine check or on a signal processor (SIGP) store additional status at address operation. For instance, when a machine check occurs on a CPU, the architected register context of the CPU is recorded in storage. Most of the architected register context—including the program status word (PSW), general registers, access registers, control registers, floating point registers, floating point control register, clock comparator, CPU timer, TOD (Time-Of-Day) programmable register, breaking event address register, and prefix register—are stored into assigned storage locations in the lower two blocks of real storage (that is, into the prefix area). Further, the architecture has been extended to include a machine check extended save area (MCESA) that is discontiguous from the prefix area to save additional information, including, in accordance with an aspect of the present invention, the guarded storage registers.

As shown in FIG. 13A, in one example, a machine check extended save area 1300 includes content 1304 indicating the information that is saved. In one example, the offsets of the content are shown at 1302, and an amount of extended save area that is stored is based on the length characteristic (LC) shown at 1306.

In one example, content 1304 includes contents of the guarded storage registers, including contents 1306 of the guarded storage designation register, contents 1308 of the guarded storage section mask register, and contents 1310 of the guarded storage event parameter list register. In one example, the guarded storage registers are stored in the same format as that of the guarded storage control block.

The validity of contents of locations 1024-1055 of the machine check extended save area is indicated by, e.g., a guarded storage register validity bit, e.g., bit 36 of a machine check interruption code (MCIC) stored at, e.g., real locations 232-239. When one, it indicates that the contents of those locations reflect the correct state of the guarded storage registers at the point of interruption.

The machine check extended save area is designated by a machine check extended save area designation (MCESAD), an example of which is depicted in FIG. 13B. A machine check extended save area designation 1350 includes, for instance, a machine check extended save area origin (MCESAO) 1352 used to indicate the origin of the machine check extended save area, and a length characteristic (LC) 1354 representing the size and alignment of the MCESA.

In one example, the length characteristic is a power of two, and effects of the length characteristic include, for instance:
  When the guarded storage facility is not installed, or when the facility is installed, but the LC field is zero, the size of the machine check extended save area is assumed to be 1,024 bytes; this ensures compatible operation for older software that is unaware of the guarded storage facility.
  When the guarded storage facility is installed and the LC field is any value from, e.g., 1 to 9, it is assumed to be an error, and the entire MCESAO is treated as if it contained zeros (that is, no MCESA is stored).
  When the guarded storage facility is installed and the LC field contains a value greater than or equal to, e.g., 10, then the size and alignment of the MCESA are $2^{LC}$ bytes. In this case, bits 0 through 63-LC of the MCESAD form the machine check extended save area origin (MCESAO). The MCESAO, with LC bits of zeros appended on the right, form the 64-bit address of the machine check extended save area.

Similar to the machine check extended save area, when the guarded storage facility is installed, a parameter register of, e.g., a Signal Processor (SIGP) instruction, used to capture contents of selected registers of a CPU, is extended to include additional status information. As shown in FIG. 13C, a SIGP parameter register 1380 for the store additional status at address order includes an additional status area origin 1382 used to indicate the origin of the additional area, and a length characteristic (LC) 1384 representing the size and alignment of the additional status area.

In one example, when the guarded storage facility is installed, if a reserved LC value is specified, or if any reserved bit position in the parameter register is not zero, the SIGP order is not accepted by the addressed CPU, the invalid parameter bit (e.g., bit 55) is indicated in the status register designated by the $R_1$ field of the SIGP instruction, and the instruction completes by setting condition code 1.

Further details regarding processing associated with a guarded storage event are described below. Some of the processing depends on the execution mode of the processor. For instance, the processor may be in nontransactional execution mode or transactional execution mode. Further, if in transactional mode, it may be in nonconstrained transactional mode or constrained transactional mode, and processing may depend thereon. Certain details are described with reference to the z/Architecture; however, one or more aspects apply to other architectures. The z/Architecture is only one example.

When a guarded storage event is recognized while the CPU is in the transactional execution mode, the following occurs:
1. The transaction is aborted with, e.g., abort code 19. If a transaction diagnostic block (TDB) address is not valid, or if the TDB address is valid and accessible, condition code 2, as an example, is set in the transaction abort PSW. If the TDB address is valid, but the TDB is not accessible, condition code 1, as an example, is set in the transaction abort PSW.
2. Depending on the model, the second operand of the Load Guarded or Load Logical Guarded And Shift instruction may be refetched to determine whether the guarded storage event condition still exists.
   When the second operand is refetched and the guarded storage event condition no longer exists, normal transaction abort processing concludes by the loading of the transaction abort PSW. Guarded storage event processing does not occur in this case.
   When the second operand is not refetched, or when it is refetched and the guarded storage event condition persists, guarded storage event processing occurs, as described herein (instead of loading the transaction abort PSW; i.e., without the guarded storage facility, when transactional execution is aborted, control is passed to the instruction designated by the transaction abort PSW. For a nonconstrained transaction, this is the instruction following the outermost TBEGIN instruction that started transactional execution. Typically, this will transfer control to a transaction abort handler that can potentially alter program conditions to make a subsequent attempt at transactional execution successful. For a constrained transaction, the transaction abort PSW designates the TBEGINC instruction. Thus, transaction is re-driven without any intervention from an abort handler.) When a GSE is recognized during transactional execution, the transaction is aborted. Re-driving the transaction without resolving the GSE will not be productive. Thus, control is passed to the GSE handler following a transaction abort, and the GSE handler manages the event, as described herein.
   In this case, the TX bit is set in the GSECI field, and if the CPU was in the constrained transactional execution mode, then the CX bit is also set.

When a guarded storage event occurs, the GSE instruction address (GSEIA) contains the address of the LGG or LLGFSG instruction that caused the event. Typically, the program can branch back to this address after resolving the GSE, and attempt to continue with accessing the object that originally caused the event. However, in transactional execution (TX) mode, a transaction is aborted by a guarded storage event, and branching back to the LGG/LLGFSG instruction is inappropriate, as other instructions in the transaction leading up to the GSE will have been discarded. Thus, in accordance with an aspect of the present invention, based on an abort due to a GSE, processing includes, for instance, branching to a GSE handler after transactional abort to resolve the GSE; providing an indication to the GSE handler that the CPU was in transactional mode; and providing the address of the TBEGIN/TBEGINC instruction that initiated the transaction causing the GSE, such that the GSE handler can re-drive the transaction.

Regardless of whether the CPU was in the transactional execution mode when a guarded storage event is recognized, the guarded storage event parameter list address (GSEPLA) register is used to locate the guarded storage event parameter list (GSEPL). The content of the GSEPLA register is a 64-bit address, and 64 bits of the address are used regardless of the current addressing mode. The GSEPL is accessed using the current translation mode, except that when the CPU is in the access register mode, the GSEPL is accessed using the primary address space.

If an access exception is recognized when accessing the GSEPL, processing is as follows:
  A program interruption occurs.
  If the CPU was not in the transactional execution mode, then the instruction address in the program old PSW is set as follows:
    If the exception condition results in nullification, the instruction address points to the instruction causing the guarded storage event (that is, the address of the LGG or LLGFSG, or the address of the execute-type instruction whose target is the LGG or LLGFSG, as examples).
    If the exception condition results in suppression or termination, the instruction address points to the next sequential instruction following the instruction that caused the guarded storage event.
  If the CPU was in the transactional execution mode, the transaction abort PSW is placed into the program old PSW.
    For all access-exception conditions except addressing, the side effect access indication, e.g., bit 54 of the translation exception identification (TEID) at real locations 168-175, is set to one. (The TEID is not stored for addressing exceptions.)
  The remaining guarded storage event processing, described below, does not occur when the GSEPL is not accessible.

If the GSEPL is accessible, the following actions are performed using the fields of the GSEPL:
  Bytes 0 and 4-7 of the GSEPL are set to zeros.
  An indication of the addressing mode is placed into the guarded storage event addressing mode (GSEAM, byte 1 of the GSEPL), as follows:
    Bits 0-5 of the GSEAM are set to zeros.
    Bits 6 and 7 of the GSEAM are set to bits 31 and 32 of the PSW at the time the guarded storage event was recognized.
  An indication of the cause of the event is placed into the guarded storage event cause indication field (GSECI, byte 2 of the GSEPL), as follows:
    If the CPU was in the transactional execution mode when the guarded storage event was recognized, bit 0 of the GSECI is set to one; otherwise, bit 0 of byte 2 is set to zero.
    If the CPU was in the constrained transactional execution mode when the guarded storage event was recognized, bit 1 of the GSECI is set to one; otherwise, bit 1 of the GSECI is set to zero.
    Bits 2-6 of the GSECI are set to zeros.
    Bit 7 of the GSECI is set to designate the instruction that caused the guarded storage event. A value of zero means the event was caused by a LGG instruction; a value of one means the event was caused by a LLGFSG instruction, as examples.
  An indication of the PSW DAT, addressing mode, and address space controls are placed into the guarded storage event access indication field (GSEAI, byte 3 of the GSEPL), as follows:
    Bit 0 of the GSEAI is reserved and set to zero.
    The current translation mode, bit 5 of the PSW, is placed into bit 1 of the GSEAI.
    If DAT is on, bits 16-17 of the PSW are placed into bits 2-3 of the GSEAI. If DAT is off, bits 2-3 of the GSEAI are unpredictable.
    If the CPU is in the access register mode, the access-register number corresponding to the $B_2$ field of the LGG or LLGFSG instruction causing the event is placed into bits 4-7 of the GSEAI. If the CPU is not in the AR mode, bits 4-7 of the GSEAI are unpredictable.
  The instruction address in the PSW is replaced by the contents of the guarded storage event handler address field (GSEHA, bytes 8-15 of the GSEPL). The GSEHA field is considered to be a branch address. The current addressing mode is unchanged.
  The address of the instruction causing the guarded storage event is placed into the guarded storage event instruction address field (GSEIA, bytes 16-23 of the GSEPL). The address placed in the GSEIA is either that of the LGG or LLGFSG instruction, or that of the execute-type instruction whose target is a LGG or LLGFSG, as examples. The GSEIA is also placed into the breaking event address register.
  The second operand address of the LGG or LLGFSG instruction is placed into the guarded storage event operand address (GSEOA, bytes 24-31 of the GSEPL). If transactional execution was aborted due to the recognition of a guarded storage event, the GSEOA field contains the operand address formed during transactional execution.
  The intermediate result of the LGG or LLGFSG instruction is placed into the guarded storage event intermediate result field (GSEIR, bytes 32-39 of the GSEPL). If transactional execution is aborted due to the recognition of a guarded storage event, the GSEIR field is formed using the guarded storage operand address (GSEOA) field. However, if the guarded storage event was recognized during transactional execution, it is model dependent whether the GSEIR contains the value that was transactionally fetched or the value that was fetched after the transaction was aborted.
  The GSE intermediate address (i.e., the pointer loaded by LGG or LLGFSG) is formed after the transaction has been aborted. In one embodiment, if the operand of the LGG/LLGFSG was transactionally altered during the transaction, the GSEIA will not show those changes.

If the CPU was in the transactional execution mode when the guarded storage event was recognized, the instruction address of the transaction abort PSW is placed in the guarded storage event return address field (GSERA, bytes 40-47 of the GSEPL). If the CPU was in the constrained transactional execution mode, the GSERA designates the TBEGINC (Transaction Begin Constrained) instruction. If the CPU was in the nonconstrained transactional execution mode, the GSERA designates the instruction following the TBEGIN (Transaction Begin) instruction. Following GSE handling, the handler can branch to this address to retry the transaction.

If the CPU was not in the transactional execution mode when the guarded storage event was recognized, the content of the GSERA field is identical to that of the GSEIA field.

Finally, the LGG or LLGFSG instruction is considered to have completed without altering general register $R_1$.

As described herein, programming languages that implement a storage coalescing technique, known as storage reclamation or garbage collection, may benefit from the guarded storage facility. In such a programming model, a reference to a program object is performed by first loading a pointer to the object. The Load Guarded and Load Logical Guarded And Shift instructions provide the means by which the program can load a pointer to an object and determine whether the pointer is usable. If no guarded storage event (GSE) is recognized, the pointer can be used to reference the object. However, if a GSE is recognized, it may indicate that the current pointer designates a storage location that is being reorganized, in which case the object may have been relocated elsewhere. The GSE handler routine may then modify the pointer to designate the object's new location, and then branch to a location designated by the GSEIA to resume normal program execution.

In response to a GSE that is recognized when the CPU is in the transactional execution mode, the program's GSE handler can attempt to correct the condition that caused the event (that is, update the operand of the LGG or LLGFSG), and then re-execute the transaction by branching to the location designated by the GSERA. If nonconstrained transactional execution was aborted, the program is to set the condition code to either 2 or 3 prior to branching to the GSERA, depending on whether the condition causing the event was or was not corrected, respectively. If constrained transactional execution was aborted, then the program is not to branch to the location designated by the GSERA unless the condition causing the event has been corrected; otherwise, a program loop may result.

To ensure reliable contents of the guarded storage event intermediate result (GSEIR) field, a program executing in the transactional execution mode is to use a Nontransactional Store instruction (which performs a nontransactional store access) if it modifies the second operand location of a Load Guarded instruction that is subsequently executed in the same transaction.

Similar to other instructions that alter the PSW instruction address, a specification exception is recognized if the PSW instruction address (loaded from the GSEHA field) is odd following a guarded storage event.

During GSE processing, the CPU may recognize an access exception when attempting to update the guarded storage event parameter list (GSEPL). Such an access exception may be totally innocuous, for example, due to the GSEPL being temporarily paged out to auxiliary storage by the operating system. Assuming the operating system remedies the exception, it will load the program old PSW to resume execution of the interrupted program.

If an access exception is recognized when accessing the GSEPL, and the CPU was not in the transactional execution mode, the instruction address of the program old PSW will be set as follows, in one example:

If the exception resulted in nullification, the instruction address will point to the LGG or LLGFSG instruction that caused the GSE (or the execute-type instruction whose operand was the LGG or LLGFSG), as examples.

If the exception resulted in suppression or termination, the instruction address will point to the next sequential instruction following the instruction that caused the GSE for suppressing or terminating exceptions.

If an access exception is recognized when accessing the GSEPL, and the CPU was in the nonconstrained transactional execution mode, the program old PSW will designate the instruction following the outermost TBEGIN; if the CPU was in the constrained transactional execution mode, the program old PSW will designate the TBEGINC instruction.

If the CPU was in the nonconstrained transactional execution mode and a TDB (transaction diagnostic block) is stored, abort code 19 indicates that transactional execution was aborted due to a GSE. However, a transaction abort-handler routine cannot assume that abort code 19 necessarily indicates that the GSE handler routine has corrected the cause of the GSE (because of the possible access-exception condition when accessing the GSEPL). In this scenario, an abort-handler routine may re-execute the transaction multiple times to allow for operating system resolution of one or more translation exceptions and to allow the GSE handler to correct the cause of the GSE.

Described above is a guarded storage facility, including instructions to load and store controls regulating the operation of the guarded storage facility, used to facilitate processing within a computing environment. One or more aspects of the present invention are inextricably tied to computer technology and facilitate processing within a computer, improving performance thereof.

Figure 14A:
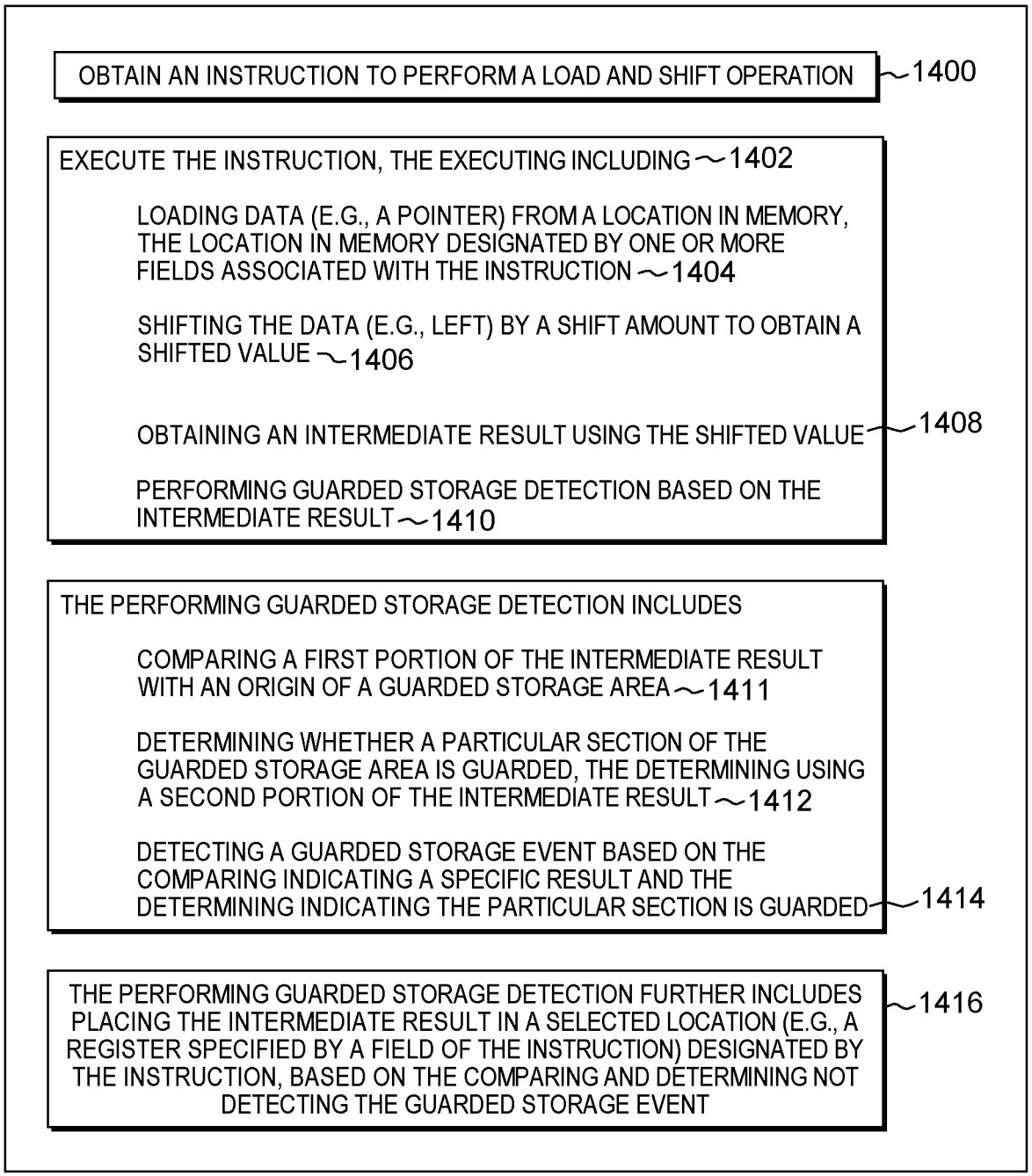
FIGS. 14A-14B depict one embodiment of aspects relating to facilitating processing in a computing environment, in accordance with an aspect of the present invention.

One embodiment of aspects of the invention relating to facilitating processing in a computing environment is described with reference to FIGS. 14A-14B. Referring to FIG. 14A, in one example, an instruction to perform a load and shift operation is obtained (1400), and the instruction is executed (1402). The executing includes, for instance, loading data (e.g., a pointer) from a location in memory, the location in memory designated by one or more fields associated with the instruction (1404); shifting the data (e.g., left) by a shift amount to obtain a shifted value (1406); obtaining an intermediate result using the shifted value (1408); and performing guarded storage detection based on the intermediate result (1410).

In one embodiment, the performing guarded storage detection includes comparing a first portion of the intermediate result with an origin of a guarded storage area (1411); determining whether a particular section of the guarded storage area is guarded, the determining using a second portion of the intermediate result (1412); and detecting a guarded storage event based on the comparing indicating a specific result and the determining indicating the particular section is guarded (1414).

The performing guarded storage detection further includes, in one embodiment, placing the intermediate result in a selected location designated by the instruction (e.g., a register specified by a field of the instruction), based on the comparing and determining not detecting the guarded storage event (1416).

Figure 14B:
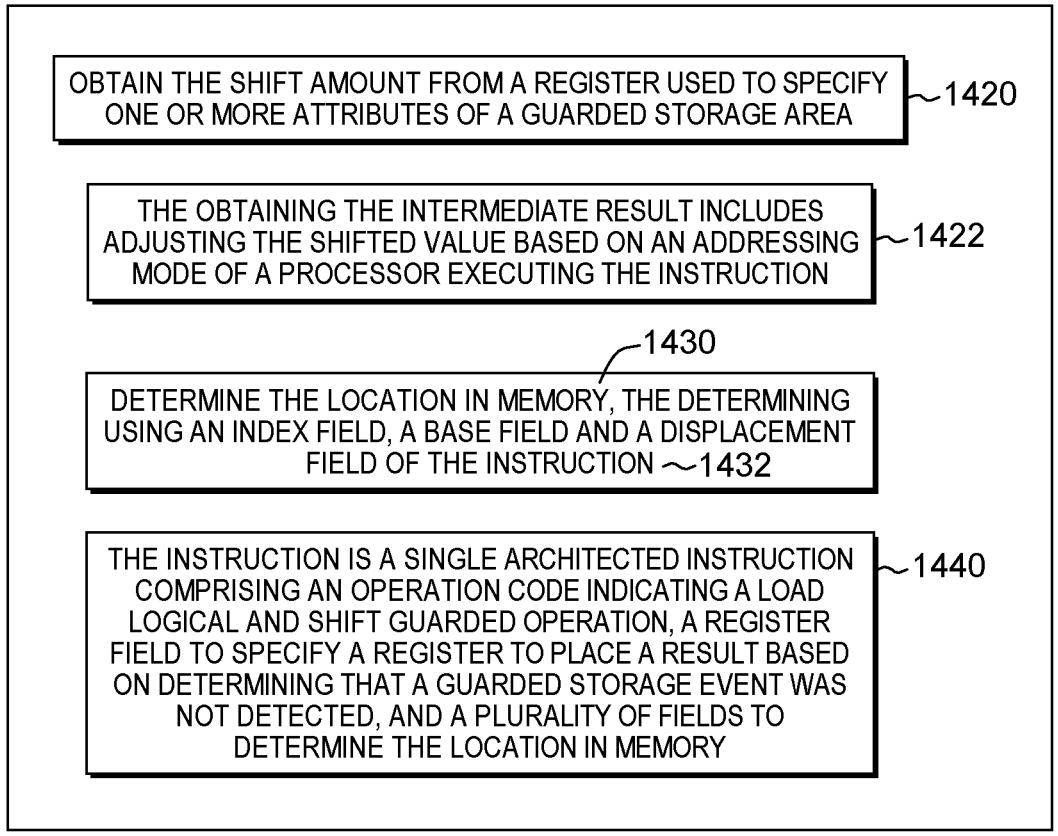

Further, in one embodiment, referring to FIG. 14B, the shift amount is obtained from a register used to specify one or more attributes of a guarded storage area (1420).

Moreover, as one example, the obtaining the intermediate result includes adjusting the shifted value based on an addressing mode of a processor executing the instruction (1422).

In a further embodiment, the location in memory from which data is loaded is determined (1430), and the determining includes, for instance, using an index field, a base field and a displacement field of the instruction (1432).

As one particular example, the instruction is a single architected instruction comprising an operation code indicating a load logical and shift guarded operation, a register field to specify a register to place a result based on determining that a guarded storage event was not detected, and a plurality of fields to determine the location in memory (1440).

Many variations are possible.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing in a computing environment, said computer program product comprising:
   at least one computer readable storage medium readable by at least one processing circuit and storing instructions for performing a method comprising:
      obtaining an instruction to perform, at least, a load operation and a shift operation, the instruction comprising a single architected instruction at a hardware/software interface and being one instruction of an instruction set that includes a plurality of instructions, the instruction comprising an operation code that specifies, at least, the load operation and the shift operation; and
      executing the instruction, the executing comprising:
         loading data from a location in memory, the location in memory designated by one or more fields associated with the instruction;
         shifting the data loaded from the location in memory in a selected direction by a shift amount to obtain a shifted value;
         obtaining an intermediate result using the shifted value; and
         performing guarded storage detection based on the intermediate result, wherein the loading, shifting, obtaining and performing are performed as part of executing the single architected instruction.

2. The computer program product of claim 1, wherein the data comprises a pointer.

3. The computer program product of claim 1, wherein the shifting comprises shifting the data left by the shift amount to obtain the shifted value.

4. The computer program product of claim 1, wherein the method further comprises obtaining the shift amount from a register used to specify one or more attributes of a guarded storage area.

5. The computer program product of claim 1, wherein the performing guarded storage detection comprises:
comparing a first portion of the intermediate result with an origin of a guarded storage area;
determining whether a particular section of the guarded storage area is guarded, the determining using a second portion of the intermediate result; and
detecting a guarded storage event based on the comparing indicating a specific result and the determining indicating the particular section is guarded.

6. The computer program product of claim 5, wherein the performing guarded storage detection further comprises placing the intermediate result in a selected location designated by the instruction, based on the comparing and determining not detecting the guarded storage event.

7. The computer program product of claim 6, wherein the selected location is a register specified by a field of the instruction.

8. The computer program product of claim 1, wherein the obtaining the intermediate result includes adjusting the shifted value based on an addressing mode of a processor executing the instruction.

9. The computer program product of claim 1, wherein the method further comprises determining the location in memory, the determining using an index field, a base field and a displacement field of the instruction.

10. The computer program product of claim 1, wherein the operation code indicates a load logical and shift guarded operation, a register field to specify a register to place a result based on determining that a guarded storage event was not detected, and a plurality of fields to determine the location in memory.

11. A computer system for facilitating processing in a computing environment, said computer system comprising:
a memory; and
a processor in communication with the memory, wherein the computer system is configured to perform a method, said method comprising:
obtaining an instruction to perform, at least, a load operation and a shift operation, the instruction comprising a single architected instruction at a hardware/software interface and being one instruction of an instruction set that includes a plurality of instructions, the instruction comprising an operation code that specifies, at least, the load operation and the shift operation; and
executing the instruction, the executing comprising:
loading data from a location in memory, the location in memory designated by one or more fields associated with the instruction;
shifting the data loaded from the location in memory in a selected direction by a shift amount to obtain a shifted value;
obtaining an intermediate result using the shifted value; and
performing guarded storage detection based on the intermediate result, wherein the loading, shifting, obtaining and performing are performed as part of executing the single architected instruction.

12. The computer system of claim 11, wherein the performing guarded storage detection comprises:
comparing a first portion of the intermediate result with an origin of a guarded storage area;
determining whether a particular section of the guarded storage area is guarded, the determining using a second portion of the intermediate result; and
detecting a guarded storage event based on the comparing indicating a specific result and the determining indicating the particular section is guarded.

13. The computer system of claim 12, wherein the performing guarded storage detection further comprises placing the intermediate result in a selected location designated by the instruction, based on the comparing and determining not detecting the guarded storage event.

14. The computer system of claim 11, wherein the obtaining the intermediate result includes adjusting the shifted value based on an addressing mode of a processor executing the instruction.

15. The computer system of claim 11, wherein the operation code indicates a load logical and shift guarded operation, a register field to specify a register to place a result based on determining that a guarded storage event was not detected, and a plurality of fields to determine the location in memory.

16. A computer-implemented method of facilitating processing in a computing environment, said computer-implemented method comprising:
obtaining an instruction to perform, at least, a load operation and a shift operation, the instruction comprising a single architected instruction at a hardware/software interface and being one instruction of an instruction set that includes a plurality of instructions, the instruction comprising an operation code that specifies, at least, the load operation and the shift operation; and
executing the instruction, the executing comprising:
loading data from a location in memory, the location in memory designated by one or more fields associated with the instruction;
shifting the data loaded from the location in memory in a selected direction by a shift amount to obtain a shifted value;
obtaining an intermediate result using the shifted value; and
performing guarded storage detection based on the intermediate result, wherein the loading, shifting, obtaining and performing are performed as part of executing the single architected instruction.

17. The computer-implemented method of claim 16, wherein the performing guarded storage detection comprises:
comparing a first portion of the intermediate result with an origin of a guarded storage area;
determining whether a particular section of the guarded storage area is guarded, the determining using a second portion of the intermediate result; and
detecting a guarded storage event based on the comparing indicating a specific result and the determining indicating the particular section is guarded.

18. The computer-implemented method of claim 17, wherein the performing guarded storage detection further comprises placing the intermediate result in a selected location designated by the instruction, based on the comparing and determining not detecting the guarded storage event.

19. The computer-implemented method of claim 16, wherein the obtaining the intermediate result includes adjusting the shifted value based on an addressing mode of a processor executing the instruction.

20. The computer-implemented method of claim 16, wherein the operation code indicates a load logical and shift guarded operation, a register field to specify a register to place a result based on determining that a guarded storage event was not detected, and a plurality of fields to determine the location in memory.

* * * * *